(12) United States Patent
Hancock et al.

(10) Patent No.: US 10,982,731 B2
(45) Date of Patent: Apr. 20, 2021

(54) BUNGEE LOOP RETENTION ASSEMBLIES

(71) Applicant: INNOVATIVE PRODUCT SOLUTIONS, LLC, Ogden, UT (US)

(72) Inventors: Jeffrey D. Hancock, Uintah, UT (US); Christopher N. Schenck, Uintah, UT (US)

(73) Assignee: INNOVATIVE PRODUCT SOLUTIONS, LLC, Ogden, UT (US)

( * ) Notice: Subject to any disclaimer, the term of this patent is extended or adjusted under 35 U.S.C. 154(b) by 0 days.

(21) Appl. No.: 16/563,605

(22) Filed: Sep. 6, 2019

(65) Prior Publication Data

US 2021/0071738 A1 Mar. 11, 2021

(51) Int. Cl.
*F16G 11/12* (2006.01)
*B60P 7/08* (2006.01)

(52) U.S. Cl.
CPC ............ *F16G 11/12* (2013.01); *B60P 7/0823* (2013.01)

(58) Field of Classification Search
CPC ........ F16G 11/12; F16G 11/14; B60P 7/0823; Y10T 24/1408; Y10T 24/3969; Y10T 24/3973; Y10T 24/3996; Y10T 24/3987; Y10T 403/32549
USPC ................ 211/85.7; 248/309.1, 316.1, 316.7
See application file for complete search history.

(56) References Cited

U.S. PATENT DOCUMENTS

| | | | | |
|---|---|---|---|---|
| 3,897,161 A | * | 7/1975 | Reinwall, Jr. | F16G 11/103 403/211 |
| 3,953,144 A | * | 4/1976 | Boden | F16G 11/101 403/374.2 |
| 4,156,574 A | * | 5/1979 | Boden | F16G 11/106 24/115 M |
| 4,455,717 A | * | 6/1984 | Gray | F16G 11/14 24/115 M |
| 4,610,053 A | * | 9/1986 | Tomita | B65D 77/185 24/136 R |
| 4,807,333 A | * | 2/1989 | Boden | A43C 7/08 24/136 R |
| 4,878,269 A | * | 11/1989 | Anscher | F16G 11/101 24/115 G |
| 5,078,279 A | * | 1/1992 | Hancock | A47B 81/005 211/64 |
| 5,208,950 A | * | 5/1993 | Merritt | F16G 11/14 24/115 H |
| 5,473,797 A | * | 12/1995 | Wu | E06B 9/326 160/178.1 R |

(Continued)

*Primary Examiner* — Jennifer E. Novosad
(74) *Attorney, Agent, or Firm* — Maschoff Brennan

(57) ABSTRACT

A bungee loop retention assembly includes a housing, bungee channels, and a hold. The housing includes a first end and a second end. The bungee channels are disposed in the housing and extend from the first end to the second end. The hold is positioned at least partially in the housing and includes an external portion and retainers configured to interfere with a portion of a bungee retained in the bungee channel. The external portion has a central section between sleeves that define openings sized to surround portions of the bungee. The hold translates from a first position in which the retainers squeeze the bungee against a channel surface to a second position in which the retainers are separated from the bungee. In the first position, the bungee is bound to the openings and to the housing such that an intra-mechanism force pulls the hold against the housing.

17 Claims, 16 Drawing Sheets

(56) References Cited

U.S. PATENT DOCUMENTS

| | | | | |
|---|---|---|---|---|
| 5,613,457 | A * | 3/1997 | Frank | B63B 21/04 114/218 |
| 5,669,119 | A * | 9/1997 | Seron | F16G 11/101 24/115 H |
| 5,894,639 | A * | 4/1999 | Boden | F16G 11/106 24/115 G |
| 6,161,314 | A * | 12/2000 | Kamrin | A43B 3/30 24/115 H |
| 6,185,798 | B1 * | 2/2001 | Ton | A43C 7/08 24/115 G |
| 6,330,949 | B1 * | 12/2001 | DeRisio | A47F 5/0006 211/113 |
| 6,457,214 | B1 * | 10/2002 | Boden | F16G 11/101 24/115 M |
| 6,484,913 | B1 * | 11/2002 | Hancock | B60R 7/14 211/64 |
| 6,618,910 | B1 * | 9/2003 | Pontaoe | F16G 11/14 24/115 H |
| 6,637,707 | B1 * | 10/2003 | Gates | A47B 81/005 211/64 |
| 6,695,183 | B2 * | 2/2004 | Hancock | B60R 11/00 211/64 |
| 6,929,223 | B2 * | 8/2005 | Hancock | B60R 11/00 211/64 |
| 7,100,808 | B2 * | 9/2006 | Hancock | F16L 3/10 224/547 |
| 7,337,934 | B2 * | 3/2008 | Alling | F16B 2/10 224/401 |
| 7,574,779 | B2 * | 8/2009 | Takahashi | F16G 11/101 24/136 L |
| 7,681,768 | B2 * | 3/2010 | Gates | B60R 11/00 224/401 |
| 8,321,999 | B2 * | 12/2012 | Boden | F16G 11/101 24/136 R |
| 8,534,519 | B2 * | 9/2013 | Hancock | B62J 7/06 224/401 |
| 8,651,289 | B2 * | 2/2014 | Diaz, Jr. | B60R 7/14 211/64 |
| 8,966,717 | B2 * | 3/2015 | Chen | E06B 9/326 160/178.1 R |
| 9,131,750 | B2 * | 9/2015 | Takahashi | A43C 7/08 |
| 9,339,408 | B2 * | 5/2016 | Chadwick | A61F 5/3776 |
| 10,076,377 | B2 * | 9/2018 | Bonutti | A61B 17/12109 |
| 10,231,555 | B2 * | 3/2019 | Hopke | A47D 9/02 |
| 10,272,964 | B2 * | 4/2019 | Buchanan | B62J 11/00 |
| 10,508,713 | B2 * | 12/2019 | Shimizu | F16G 11/044 |
| 2003/0042282 | A1 * | 3/2003 | Gates | A47B 96/061 224/560 |
| 2004/0020954 | A1 * | 2/2004 | Gates | B60R 9/048 224/442 |
| 2019/0032752 | A1 * | 1/2019 | Romero | F16G 11/101 |
| 2020/0002067 | A1 * | 1/2020 | Dershem | B65D 63/109 |

* cited by examiner

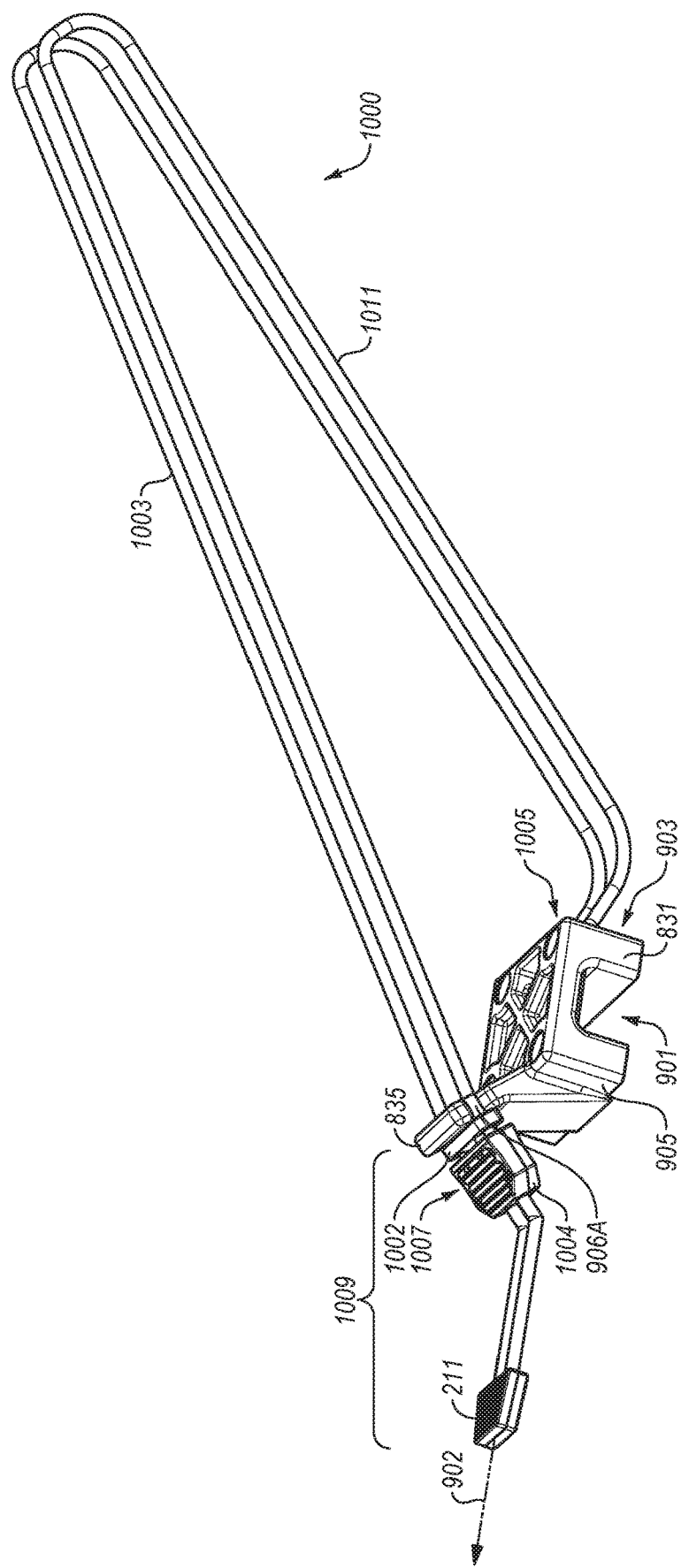

BUNGEE LOOP RETENTION ASSEMBLIES

BACKGROUND OF THE INVENTION

Field of the Invention

The present invention generally relates to equipment racks, in particular, some embodiments of the present disclosure relate to bungee loop retention assemblies that may be implemented in equipment racks.

Description of Related Art

Recreational vehicles and other vehicles such as boats and motorcycles may implement equipment racks or utility racks. The equipment racks or utility racks may be attached to the vehicle to enable a user to temporarily store items. For instance, a firearm equipment rack may be added to a recreational vehicle to store a firearm while the user drives the recreational vehicle or between use.

Equipment racks are available in multiple configurations. However, in many of these configurations, it may be difficult to quickly and easily secure the items to the equipment racks and to later remove the items from the equipment racks. Additionally, rigid structures may limit suitability of the equipment racks with some types of items. For instance, some equipment racks include rigid levered structures. These levered structures may be difficult to open and close and may limit the suitability of use of the equipment rack with particular types of items.

The subject matter claimed herein is not limited to embodiments that solve any disadvantages or that operate only in environments such as those described. Rather, this background is only provided to illustrate one example technology area where some embodiments described herein may be practiced.

BRIEF SUMMARY OF EMBODIMENTS OF THE INVENTION

A need therefore exists for bungee loop retention assemblies that eliminate or diminish the disadvantages and problems described above.

One aspect of an embodiment includes a bungee loop retention assembly. The retention assembly may include a housing, one or more bungee channels, and a hold. The housing may include a first end and a second end. The first end may be substantially opposite the second end. The housing may include an upper housing and a lower housing. The upper housing may define an upper surface face and upper portion of the bungee channels. The bungee channels may be disposed in the housing and may extend from the first end to the second end. A first portion of the first bungee channel at the first end may be substantially parallel to a second portion of the first bungee channel at the second end. In detail, a first curved portion of the first bungee channel may include an inward curve and a second curve towards the second end. The bungee channels may include a first bungee channel and a second bungee channel. The first bungee channel may be separated from the second bungee channel by a first distance at the first end and by a second distance at the second end. The first distance may be greater than the second distance. The first and the second bungee channels may bend. For instance, the first and second bungee channels may bend towards one another along curved portions of the bungee channels between the first end and the second end. A hold aperture may also be disposed in the housing. For instance, the hold aperture may be disposed on the first end of the housing. The hold may be positioned at least partially in the housing via the hold aperture. An interior portion of the hold may be positioned between the first bungee channel and the second bungee channel within the housing. The housing may include slide guides configured to retain a motion of the hold in a substantially longitudinal translation relative to the housing. The hold may include one or more retainers. The retainers may be configured to interfere with a portion of a bungee retained in the bungee channel. The hold may be configured to translate relative to the housing from a first position in which the retainers squeeze the bungee against a channel surface to a second position in which the retainers are substantially separated from the bungee. The lower housing may define a lower surface face and lower portion of the bungee channels. The upper housing and lower housing may define retainers opening in which the retainers of the hold may be positioned. The retainers may push the bungee against a portion of the channel surface at or around the curved portion. The hold may include one or more sleeves. The sleeves may extend from the first end of the housing. The sleeves may be configured to retain and surround exterior portions of the bungee adjacent to the first end of the housing. The hold may further include a central section between the sleeves. The central section may be sized and configured for retention in a hook system. In detail, the central section may include a diameter that is sized to be introduced into and retained in a hook system. The sleeves may be configured to grip the bungee. In the first position, the bungee may be bound to inner surfaces of the openings and to the housing via the retainers such that an intra-mechanism force caused by retraction of the bungee pulls the hold against the housing and presses the retainers against the bungee.

Advantageously, the retention assembly may provide an efficient, adjustable way to selectively retain an item in an equipment rack. The retention assembly may enable the equipment rack to be used with items of various sizes. Additionally, the retention assembly may be quickly attached to the equipment rack and easily removed. Moreover, the intra-mechanism force may act to maintain engagement between the bungee and housing.

Another aspect of an embodiment includes another bungee loop retention assembly. The bungee loop retention assembly may be comprised of two or more components such as a bungee, a housing, a hold, and a bungee end retainer. The bungee may include a first end and a second end and a length between the first end and the second end. The first end may be positioned next to or near the second end such that a portion of the length is in the housing. The housing includes a first end and a second end. The housing may define two or more bungee channels. The bungee channels may extend from the first end to the second end. The housing may include a hold aperture, which may be disposed on a first end of the housing. The bungee channels may have a channel surface that are configured to contact portions of the bungee in the housing. The first and the second bungee channels may bend toward one another along curved portions of the bungee channels, which may be positioned between the first end and the second end. The retainers may push or force the bungee against a portion of the channel surface at the curved portion. A first portion of the first bungee channel at the first end may be substantially parallel to a second portion of the first bungee channel at the second end. A first curved portion of the first bungee channel may include an inward curve and a second curve towards the second end. The hold may be positioned at least partially in the housing. The hold may include two or more retainers that may be configured to interfere with portions of the bungee retained in the bungee channel. The hold may be configured to translate relative to the housing. In a first position, the retainers may apply a first pressure to the bungee against a portion of the channel surface. In a second position, the retainers may apply a second, lower pressure to the bungee against the portion of the channel surface. Additionally, in the first position, the bungee may be bound to inner surfaces of the openings and to the housing via the retainers such that an intra-mechanism force caused by retraction of the bungee pulls the hold against the housing and presses the retainers against the bungee. The bungee channels may define retainer openings along a portion of an interior part of the channel surface. The retainers of the hold are disposed in and translate in the retainer openings. An interior portion of the hold may be positioned between the first bungee channel and the second bungee channel within the housing. The housing may include slide guides. The slide guides may be configured to retain a motion of the hold in a substantially longitudinal translation relative to the housing. The hold may also include one or more sleeves. The sleeves may extend from the first end of the housing. The hold may also include a central section between the sleeves. The sleeves may be configured to retain and surround exterior portions of the bungee. In detail, the sleeves may be configured to retain and surround exterior portions of the bungee adjacent to the first end of the housing. The central section is sized and configured for retention in a hook system. The bungee end retainer may connect the first end and the second end of the bungee.

An additional aspect of an embodiment includes an equipment rack. The equipment rack may be implemented on recreational vehicles, boats, motorcycles, automobiles, and the like. The equipment rack may include an equipment mount and a bungee loop retention assembly. The equipment mount may have a hook system. The hook system may be disposed along a portion of an outer edge of the equipment mount. The hook system may include a first set of cavities disposed along a first side and a second set of cavities on a second side. The bungee loop retention assembly may be configured to extend from one of the first set of cavities across the equipment mount. The bungee loop retention assembly may include a bungee, a housing, and a hold. The bungee may have a first end and a second end and a length between the first end and the second end. The first end may be positioned next to or near the second end. A first portion of the length between the first and second ends is configured to be secured in one of the first plurality of cavities. The housing may define two bungee channels and a hold aperture. The bungee channels may have a channel surface that are configured to contact portions of the bungee in the housing. The hold may be positioned at least partially in the housing. The hold may include two or more retainers that are configured to interfere with portions of the bungee retained in the bungee channel. An external portion of the hold may have one or more sleeves and a central section between the two sleeves. The two sleeves may be configured to retain and surround exterior portions of the bungee. In detail, the sleeves may retain and surround adjacent to a first end of the housing. The central section of the hold may be sized and configured for retention in one cavity of the second set of cavities. The hold may be configured to translate relative to the housing. Translation of the hold may result in the hold being in two or more positions relative to the housing. In a first position, the retainers apply a first pressure to the bungee against a portion of the channel surface. In a second position, the retainers apply a second, lower pressure to the bungee against the portion of the channel surface. In the first position, the bungee may be bound to inner surfaces of the openings and to the housing via the retainers such that an intra-mechanism force caused by retraction of the bungee pulls the hold against the housing and presses the retainers against the bungee. The bungee channels may define retainer openings along a portion of an interior part of the channel surface. The retainers of the hold may be disposed in and translate in the retainer openings. The first and the second bungee channels may bend. In detail, the first and second bungee channels may bend towards one another along curved portions of the bungee channels between the first end and the second end. The retainers may push the bungee against a portion of the channel surface at the curved portion.

These and other aspects, features and advantages of the present invention will become more fully apparent from the following brief description of the drawings, the drawings, the detailed description of preferred embodiments and appended claims.

BRIEF DESCRIPTION OF THE DRAWINGS

The appended drawings contain figures of preferred embodiments to further illustrate and clarify the above and other aspects, advantages, and features of the present invention. It will be appreciated that these drawings depict only preferred embodiments of the invention and are not intended to limit its scope. The invention will be described and explained with additional specificity and detail through the use of the accompanying drawings in which:

FIG. 9B illustrates another view of the upper element and the second bungee loop retention assembly of FIG. 9A;

DETAILED DESCRIPTION OF SOME EXEMPLARY EMBODIMENTS

The present invention is directed towards bungee loop retention assemblies and equipment racks that may implement a bungee loop retention assembly. The principles of the present invention, however, are not limited bungee loop retention assemblies. It will be understood that, in light of the present disclosure, the components and arrangements disclosed herein can be successfully used in connection with other types bungee loop retention assemblies and/or equipment racks.

Additionally, to assist in the description of the bungee loop retention assemblies, words such as top, bottom, front, rear, right, and left may be used to describe the accompanying figures. It will be appreciated that the bungee loop retention assemblies can be disposed in other positions, used in a variety of situations and may perform a number of different functions. In addition, the drawings may be to scale and may illustrate various configurations, arrangements, aspects, and features of the bungee loop retention assemblies. It will be appreciated, however, that the bungee loop retention assemblies may have other suitable shapes, sizes, configurations, and arrangements depending, for example, upon the intended use of the bungee loop retention assemblies. Further, the bungee loop retention assemblies may include any suitable number or combination of aspects, features and the like. A detailed description of exemplary embodiments of the bungee loop retention assemblies now follows.

Figure 1A:
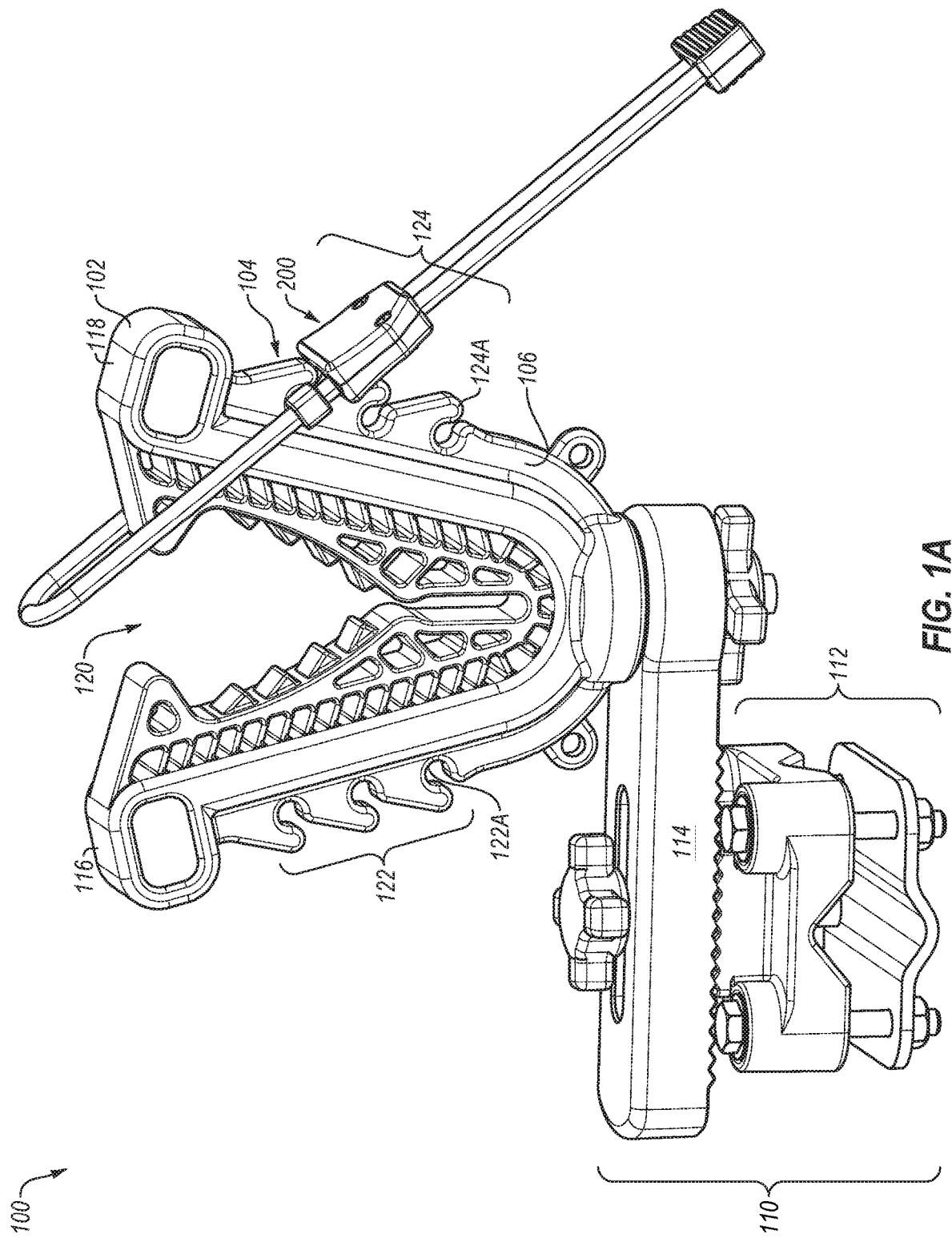
FIG. 1A illustrates an example equipment rack that may implement one or more embodiments of a bungee loop retention assembly (retention assembly)
Figure 1B:
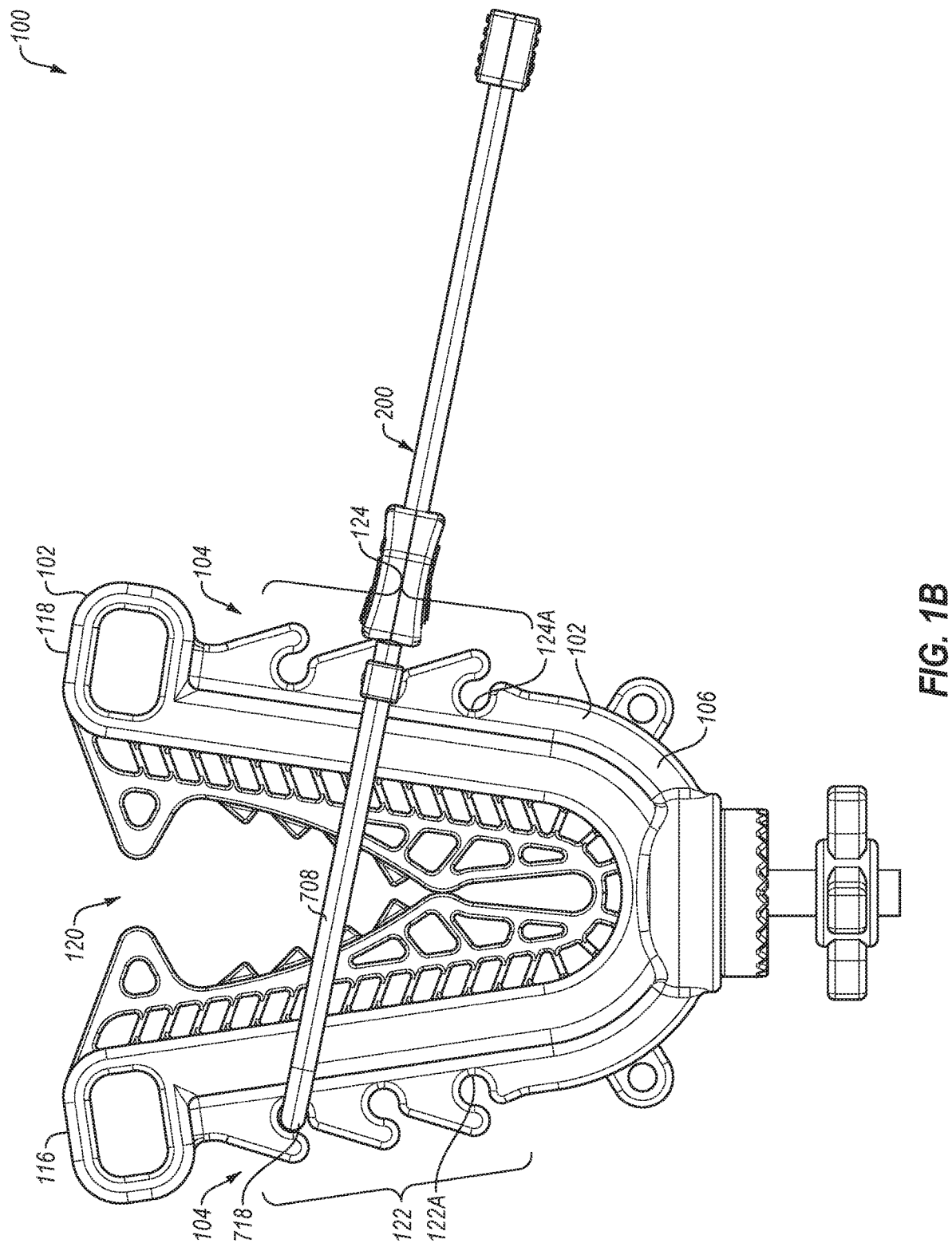
FIG. 1B illustrates another view the equipment rack of FIG. 1A with the retention assembly in another configuration.

FIGS. 1A and 1B illustrate an example equipment rack 100. FIG. 1A depicts the equipment rack 100 in a first configuration in which an equipment mount 102 is depicted disengaged from a bungee loop retention assembly 200 (hereinafter, retention assembly 200). FIG. 1B depicts the equipment rack 100 in a second configuration in which the retention assembly 200 is engaged with the equipment mount 102.

The equipment rack 100 may be implemented to retain an article or item relative to a vehicle. For instance, the equipment mount 102 may be connected to or may include a connection apparatus 110 (in FIG. 1A). The connection apparatus 110 may include a clamp 112 and a frame element 114 that connects to the equipment mount 102. The clamp 112 may surround and be retained relative to an element of the vehicle. For instance, the clamp 112 may be fastened to the element of the vehicle such as a luggage rack, a roll bar, a gun rack mount, a gun rack mount, etc. The vehicle may include, for example, a recreational vehicle or another suitable vehicle such as a "Quad," an all terrain vehicle (ATV), an off-road vehicle, a side-by-side, a utility task vehicle (UTV), a motorcycle, a three-wheeled vehicle, a snowmobile, a snow cat, a boat, etc. The equipment rack 100 may also be implemented on a stationary structure.

The equipment mount 102 may include two arms 116 and 118. The arms 116 and 118 are disposed at an angle relative to one another. For instance, in the embodiment of FIGS. 1A and 1B, the two arms 116 and 118 are disposed relative to one another to generate a V-shaped structure or U-shaped structure. The article or item retained in the equipment mount 102 may be disposed at least partially in a volume 120 between the two arms 116 and 118.

The equipment mount 102 may include or define a hook system 104. The hook system 104 is disposed along at least a portion of an outer edge 106 of the two arms 116 and 118, which is also the outer edge 106 of the equipment mount 102. In the embodiment of FIGS. 1A and 1B, the hook system 104 includes a first set of cavities 122 disposed along a first side of the first arm 116. The hook system 104 also includes a second set of cavities 124 on a second side of the second arm 118. In some embodiments, each of the first set of cavities 122 may be positioned to correspond to one of the second set of cavities 124. For example, a first cavity 122A of the first set of cavities 122 may be positioned about the same distance from the frame element 114 as a second cavity 124A of the second set of cavities 124. In other embodiments, the first cavity 122A, as well as the other cavities of the first set of cavities 122, may be positioned a different distance from the frame element 114 than the second cavity 124A.

The equipment rack 100 also includes the retention assembly 200. The retention assembly 200 is configured to be selectively disposed across the two arms 116 and 118 to create an upper border or boundary of the volume 120. For example, the article or the item may be positioned in the volume 120 and the retention assembly 200 may be disposed across the two arms 116 and 118. When disposed across the two arms 116 and 118, the retention assembly 200 may be exterior to the article or item. In particular, the retention assembly 200 may be opposite a portion of the equipment mount 102 where the arms 116 and 118 meet. Also, the retention assembly 200 may be positioned such that the article or item is between the retention assembly 200 and the arms 116 and 118. For instance, in FIG. 1A, the retention assembly 200 is disengaged from a first arm 116 and engaged with a second arm 118 such that the volume 120 is open. In FIG. 1B, the retention assembly 200 is engaged between the two arms 116 and 118 such that the volume is bordered by the retention assembly 200.

The hook system 104 and the retention assembly 200 may enable retention of items of various sizes in the equipment rack 100. For instance, to retain a small item, the retention assembly 200 may be positioned across cavities 122 and 124 positioned closest to the portion of the equipment mount 102 where the arms 116 and 118 meet. Similarly, to retain a larger item, the retention assembly 200 may be positioned across cavities 122 and 124 positioned farthest from the portion of the equipment mount 102 where the arms 116 and 118 meet.

Figure 2A:
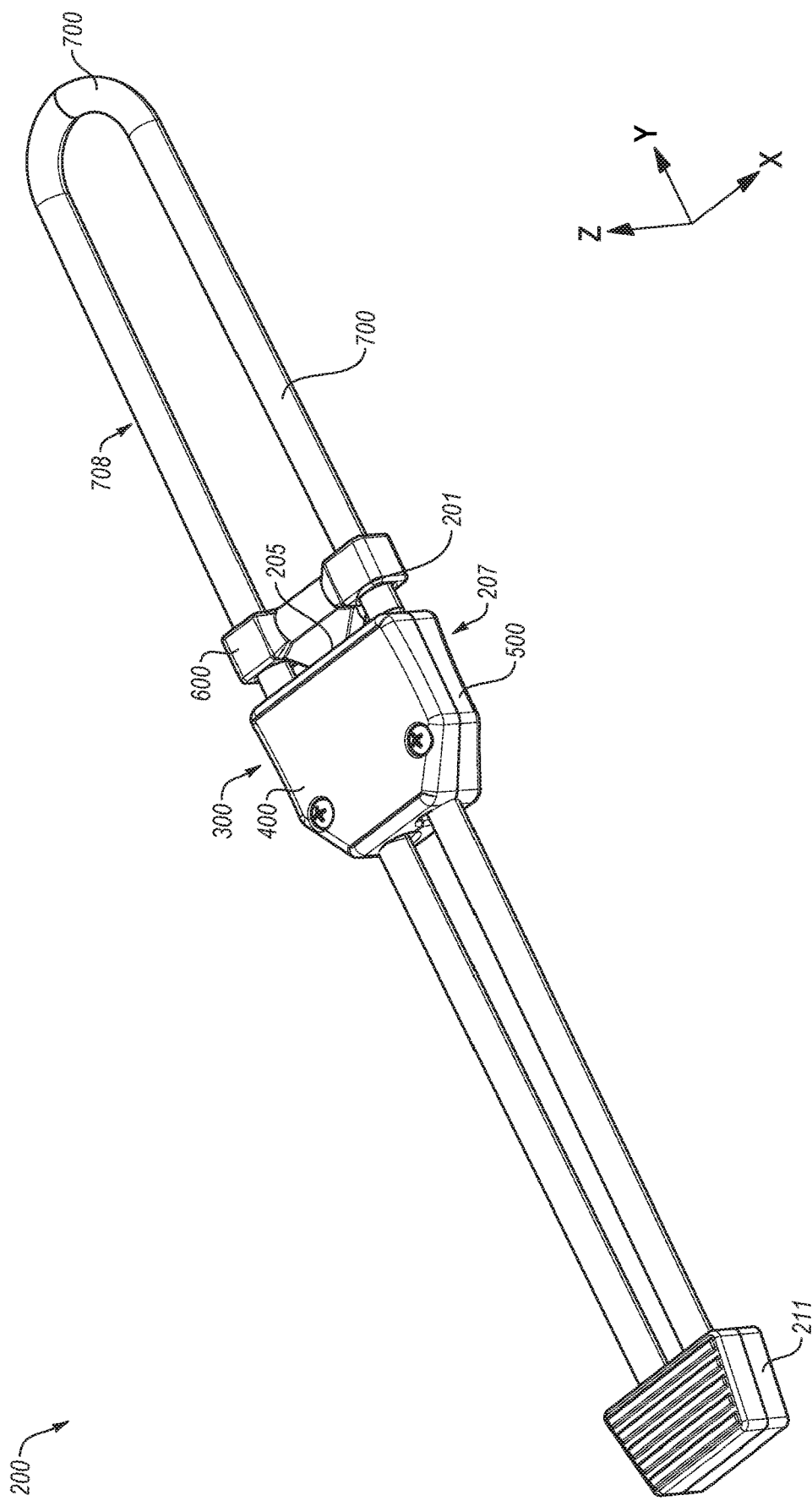
FIG. 2A illustrates the retention assembly depicted in FIGS. 1A and 1B.
Figure 2B:
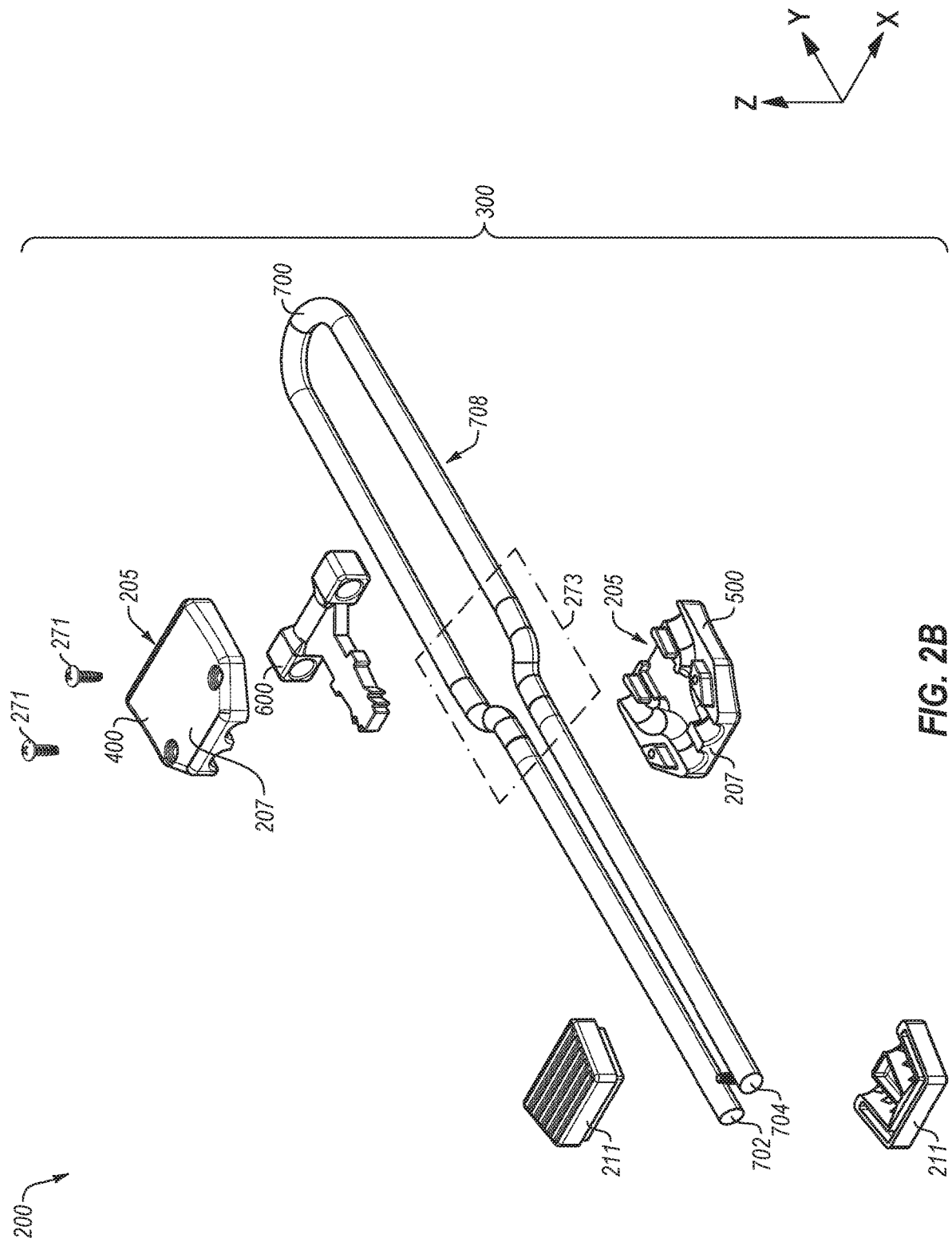
FIG. 2B illustrates an exploded view of the retention assembly of FIG. 2A.

FIGS. 2A and 2B illustrate an example embodiment of the retention assembly 200 included in the equipment rack 100 of FIGS. 1A and 1B. FIG. 2A is an assembled view of the retention assembly 200. FIG. 2B is an exploded view of the retention assembly 200. As described above, the retention assembly 200 is configured to be engaged between two arms of an equipment rack such as the two arms 116 and 118 of FIGS. 1A and 1B.

The retention assembly 200 of FIGS. 2A and 2B may include a hold 600 that may be at least partially positioned in a housing 207. For instance, the hold 600 may be placed in a hold aperture 205 such that a first portion of the hold 600 is disposed within the housing 207 and a second portion of the hold 600 is outside the housing 207. The hold 600 may move relative to the housing 207. For instance, in the embodiment of FIGS. 2A and 2B, the hold 600 may translate relative to the housing 207 in substantially the longitudinal direction, which corresponds to the y-direction of FIG. 2A.

A bungee 700 or portions thereof may be routed through the hold 600 and the housing 207. For instance, as shown in FIG. 2A, the hold 600 may include sleeves that are configured to retain and surround exterior portions of the bungee 700. For instance, the hold 600 may retain and surround portions of the bungee 700 adjacent to a first end 201 of the housing 207. An adjacent portion of the bungee 700 may include portions of the bungee 700 within a few inches (e.g., one or two inches) of the first end 201.

The hold 600 and the housing 207 may be referred to as a tightening mechanism 300. The tightening mechanism 300 may be configured in a restricted configuration and an unrestricted configuration. For instance, the hold 600 may be translated relative to the housing 207 to transition between the restricted configuration and the unrestricted configuration. In the unrestricted configuration, a portion of the bungee 700 may be positioned in the housing 207 and may slide through the tightening mechanism 300. As the bungee 700 slides through the tightening mechanism 300, a size of an upper loop portion 708 may change. For instance, as the hold 600 and the housing 207 move in the y-direction relative to the bungee 700, the upper loop portion 708 may decrease in size. As the hold 600 and the housing 207 move in the negative y-direction relative to the bungee 700, the upper loop portion 708 may increase in size.

Changes to the size of the upper loop portion 708 may enable the bungee loop retention assembly 200 to be used for a specific purpose. For instance, the upper loop portion 708 may be fit to a particular size. With reference to FIGS. 2A and 1B, the upper loop portion 708 may be enlarged or shortened to fit the arms 116 and 118. For instance, to engage the retention assembly 200 at two of the uppermost cavities 122 and 124, the upper loop portion 708 may be enlarged. To engage the retention assembly 200 at two of the lowermost cavities 122 and 124 may be shortened.

In the restricted configuration, a size of the upper loop portion 708 may be set. For example, with continued reference to FIGS. 1B and 2A, the upper loop portion 708 may be wrapped around the arms 116 and 118. The bungee loop retention assembly 200 may be transitioned to the restricted configuration. The hold 600 or a portion thereof may then be disposed in one of the cavities 124. The size of the upper loop portion 708 may then be set, which may maintain the upper loop portion 708 at a particular length. Thus, in the restricted configuration, an item placed in the arms 116 and 118 may be retained relative to the arms 116 and 118. For instance, the upper loop portion 708 may be an upper boundary of the volume 120 defined by the arms 116 and 118.

Referring to FIG. 2B, the housing 207 may include an upper housing 400 and a lower housing 500. The upper housing 400 may be mechanically attached to the lower housing 500 by one or more fasteners 271. In some embodiments, the upper housing 400 and the lower housing 500 may be attached via a press-fit or snap fit mechanical connection. Additionally, in some embodiments, the housing 207 may be a single piece.

In the embodiment of FIG. 2B, the hold aperture 205 may be defined by the upper housing 400 and the lower housing 500. For instance, at the first end 201 of the upper housing 400 and the lower housing 500 may include a cutout that is positioned to receive the hold 600 and enable translation of the hold 600.

As shown in FIG. 2B, a housed portion of the bungee 273 (hereinafter, housed portion 273) may be positioned in the housing 207. The housed portion 273 may include curved portions. For example, the housed portion 273 may include two sections that are substantially parallel as they enter the housing 207. The housed portion 273 may then curve towards one another within the housing 207. The housed portion 273 may be substantially parallel as they exit the housing 207. As described below, an internal structure of the housing 207 may correspond to the housed portion 273 of FIG. 2B.

The bungee loop retention assembly 200 may include a bungee end retainer 211. The bungee end retainer 211 may connect a first end 702 and a second end 704 of the bungee 700. In the bungee end retainer 211 the first end 702 is positioned next to the second end 704. A user may grip the bungee end retainer 211 and pull the bungee 700 such that the bungee moves through the tightening mechanism 300.

Figure 3B:
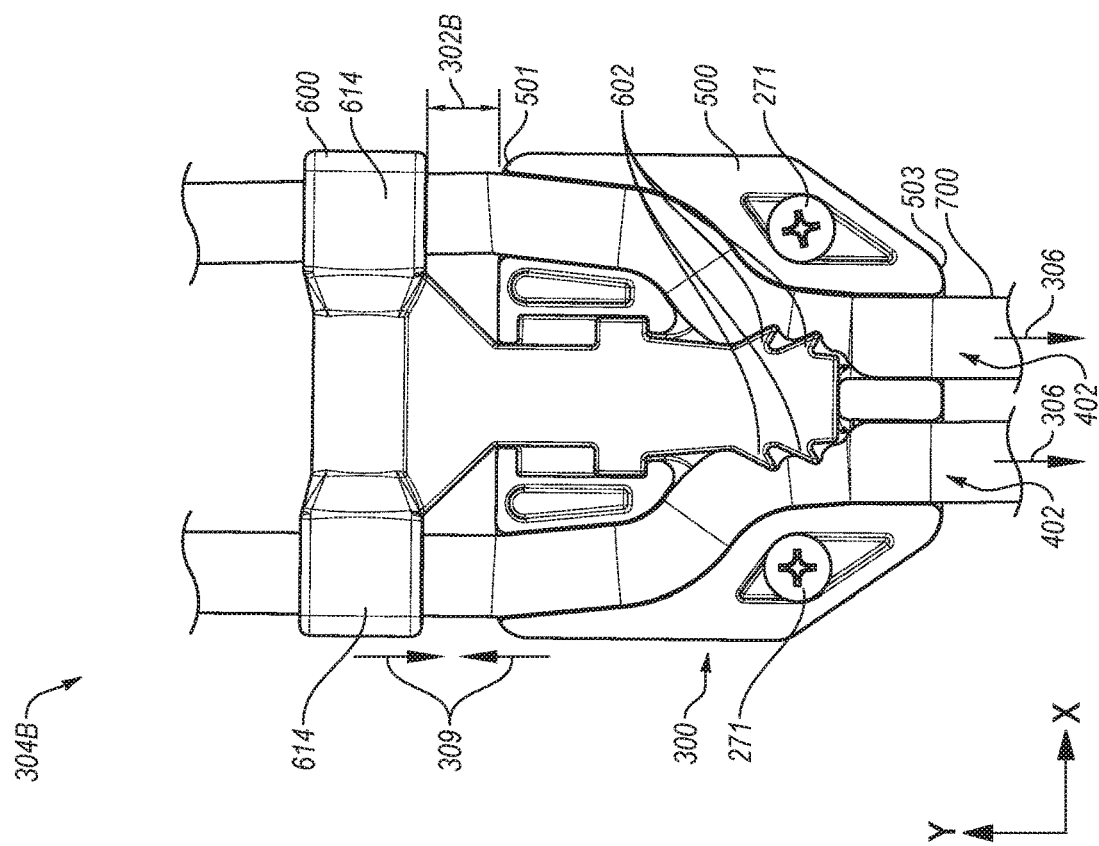
FIG. 3B illustrates another view of the portion of a tightening mechanism of FIG. 2A.
Figure 3A:
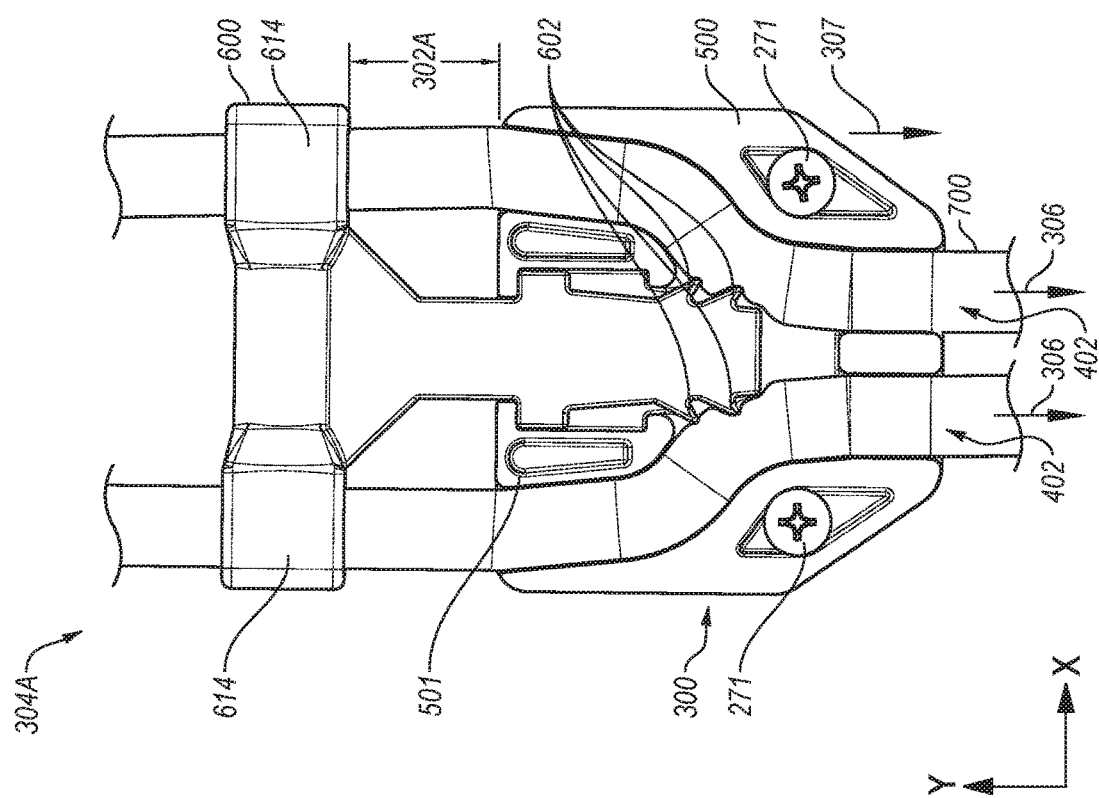
FIG. 3A illustrates a portion of a tightening mechanism that may be implemented in the retention assembly of FIG. 2A.

FIGS. 3A and 3B illustrate an example embodiment of the tightening mechanism 300 of FIGS. 2A and 2B. FIGS. 3A and 3B also illustrate an example operation by which the bungee 700 is retained and tightened relative to the housing 207 and the hold 600. For instance, FIG. 3A depicts an example of an unrestricted configuration 304A. The unrestricted configuration 304A may enable the bungee 700 to move or translate relative to the housing 207 and the hold 600. For instance, in the unrestricted configuration 304A, the bungee 700 is released from the tightening mechanism 300. FIG. 3B depicts an example of a restricted configuration 304B.

In the restricted configuration 304B, the housing 207 and/or the hold 600 limit movement of the bungee 700. For instance, the housing 207 and/or the hold 600 may limit movement in a direction oriented from the second end 503 of the lower housing 500 to the first end 501 of the lower housing 500. Additionally, in the restricted configuration 304B, the bungee 700 may be held relative to the lower housing 500 or may move in a direction oriented from the first end 501 to the second end 503. The restricted configuration 304B may be used when a user is tightening the bungee 700 or following the tightening of the bungee 700 to retain equipment.

Referring to FIGS. 3A and 3B, the lower housing 500 is depicted with the upper housing 400 removed. A portion of the bungee 700 is positioned in bungee channels 402, which extend through the lower housing 500. The bungee channels 402 bend towards one another as they extend from the first end 501 (which corresponds to the first end 201 described above) to the second end 503 of the housing 207. Correspondingly, as the bungee 700 extends from the first end 501 to the second end 503, the bungee 700 may include portions that bend towards each other. For instance, at the first end 501 the bungee 700 is farther apart in the x-direction than at the second end 503.

The hold 600 includes sleeves 614, that are positioned outside the housing 207. The bungee 700 is further retained in openings that are defined in the sleeves 614 of the hold 600. The openings are depicted in FIG. 6B and labelled 616A and 616B. Thus, the bungee 700 is disposed in the sleeves 614 and disposed in the bungee channels 402.

To retain the bungee 700 relative to the housing 207, the hold 600 may be translated (e.g., moved in the y direction and negative y-direction) relative to the lower housing 500

(and upper housing 400). The movement of the hold 600 relative to the housing 207 corresponds to transitions in the arrangement of the tightening mechanism 300 between the unrestricted configuration 304A and the restricted configuration 304B.

Accordingly, as the tightening mechanism 300 transitions between the restricted configuration 304B and the unrestricted configuration 304A, a distance 302A or 302B between the sleeves 614 of the hold 600 and the first end 501 of the lower housing 500 may change. For example, the distance 302A may increase when the hold 600 is translated away from the first end 501 and decrease when the hold 600 is translated towards the first end 501. The distances 302A and 302B may also correspond to positions of retainers 602 relative to the bungee channels 402.

In detail, when the first end 501 is separated from the sleeves 614 by the first distance 302A, the retainers 602 of the hold 600 may apply a first pressure to force the bungee 700 against the bungee channels 402. The first pressure applied by the retainers 602 may be insufficient to prevent motion of the bungee 700 relative to the housing 207/lower housing 500. Thus, in the unrestricted configuration 304A, the bungee 700 may translate through the hold 600 and the bungee channels 402. Translation of the bungee 700 through the bungee channels 402 may lengthen a portion of the bungee 700 that is positioned above (e.g., having a larger y-coordinate) the hold 600 or lengthen a portion of the bungee 700 positioned below the second end 503.

In some embodiment, to place the tightening mechanism 300 in the unrestricted configuration 304A, a user may grip or hold the lower housing 500 and pull it relative to the bungee 700 and the hold 600. The direction the lower housing 500 is pulled may be the negative y-direction of FIG. 3A. Accordingly, the hold 600 may translate relative to the lower housing 300, which may pull the retainers 602 from the bungee 700 in the bungee channels 402. In the unrestricted configuration 304A, the bungee 700 may be pulled through the hold 600 and the lower housing 300, effectively moving the tightening mechanism 300 along the bungee 700.

In some embodiments, one or more of the retainers 602 may contact the bungee 700 when the first end 501 is separated from the sleeves 614 by the first distance 302A. In other embodiments, the retainers 602 may be separated from the bungee 700 when the first end 501 is separated from the sleeves 614 by the first distance 302A. Additionally, in some embodiments, the retainers 602 may include a sloped surface that is angled or directed towards the second end 503. The sloped surface may enable the bungee 700 may move in a negative y-direction past the retainer 602. In some embodiments, the movement 700 of the bungee 700 may result in movement of the tightening mechanism 300 in a positive y-direction, which may shorten a loop of the bungee 700 above the hold 600.

With reference to FIG. 3B, in the restricted configuration 304B, the first end 501 may be separated from the sleeves 614 by the second distance 302B. When separated by the second distance 302B, the retainers 602 of the hold 600 may apply a second pressure to the bungee 700. The second pressure applied by the retainers 602 may force the bungee 700 against the bungee channel 402. The second pressure applied by the retainers 602 may be sufficient to prevent motion, to substantially prevent motion of the bungee 700, or restrict motion of the bungee 700 relative to the housing 207/lower housing 500 in the positive y-direction. For example, the hold 600 may be positioned such that the retainers 602 are positioned between portions of the bungee 700. The retainers 602 may press the bungee 700 in an outward direction (e.g., x-direction and negative x-direction) to force the bungee 700 against the bungee channels 402. For instance, as the housing 207/lower housing 500 is moved towards the hold 600, the retainers 602 are pressed against the bungee 700, which is pressed against a surface of the bungee channel 402. The retainers 602 may accordingly prevent or substantially prevent movement of the bungee 700 relative to the housing 207/lower housing 500 in the positive y-direction. Additionally, the retainers 602 may be sharp or pointed. Responsive to the second pressure, the retainers 602 may pierce, depress, or penetrate the bungee 700.

Forces may be applied to the bungee 700 to size the portions above the hold 600 and below the housing 207. For instance, when the tightening mechanism 300 is arranged in the unrestricted configuration 304A, a force 306 may be applied to the free ends of the bungee 700 in the negative y-direction. Application of the force 306 may enable a shortening of the portion of the bungee 700 above the hold 600. Additionally, application of the force 306 to the free ends may reduce a diameter of the bungee 700 as the bungee 700 stretches. The bungee 700 having a reduced diameter may be pulled through the hold 600 and the bungee channels 402. Similarly, a force 307 may be applied to the housing 207. The housing 207 and the hold 600 may be pulled along the bungee 700 to increase a size of a portion of the bungee 700 above the hold 600.

In the restricted configuration 304B, withdrawal of the force 306 from the free ends of the bungee 700 may allow the diameter of the bungee 700 to increase. When the diameter of the bungee 700 increases, an outer surface of the bungee 700 may contact and press against an inner surface of the openings of the sleeves 614. Interference between the bungee 700 and the inner surface of the openings of the sleeves 614 may bind the hold 600 to the bungee 700. For instance, the bungee 700 may be bound to the hold 600 via friction between the bungee 700 and the inner surface of the openings. As used in the present disclosure, bound may include the bungee 700 being substantially fixed or fixed to the sleeves 614 sufficient to move the hold 600 towards the housing 207. Also, the bungee 700 may expand into the bungee channels 402 and against the retainers 602.

Furthermore, withdrawal of the force 306 from the bungee 700 may enable the bungee 700 to retract. For instance, the bungee 700 under a tensile force stretches and decreases the diameter. Removal of the tensile force allows the bungee 700 to retract and the diameter to increase. The bungee 700 may be bound to the sleeves 614 as described above and bound to the housing 207 via the interference between the retainers 602 and the bungee channels 402. Accordingly, retraction of the bungee 700 may create an intra-mechanism force 309 between the housing 207 and the hold 600. The intra-mechanism force 309 may pull the hold 600 towards the housing 207, which acts to maintain the retainers 602 against the bungee 700. Thus, the bungee 700 may be secured or retained relative to the hold 600 because the contact between the bungee 700 and the sleeves 614 and the intra-mechanism force 309 caused by retraction of the bungee 700.

Figure 4A:
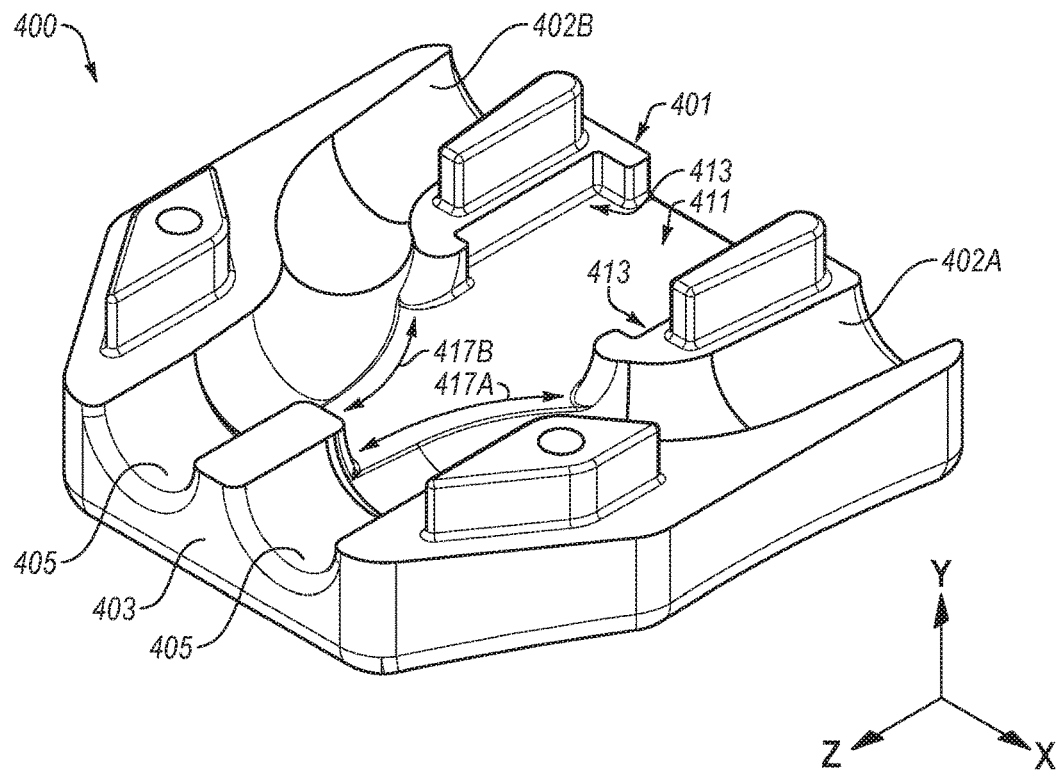
FIG. 4A illustrates an example upper housing that may be implemented in the retention assembly of FIG. 2A.
Figure 4B:
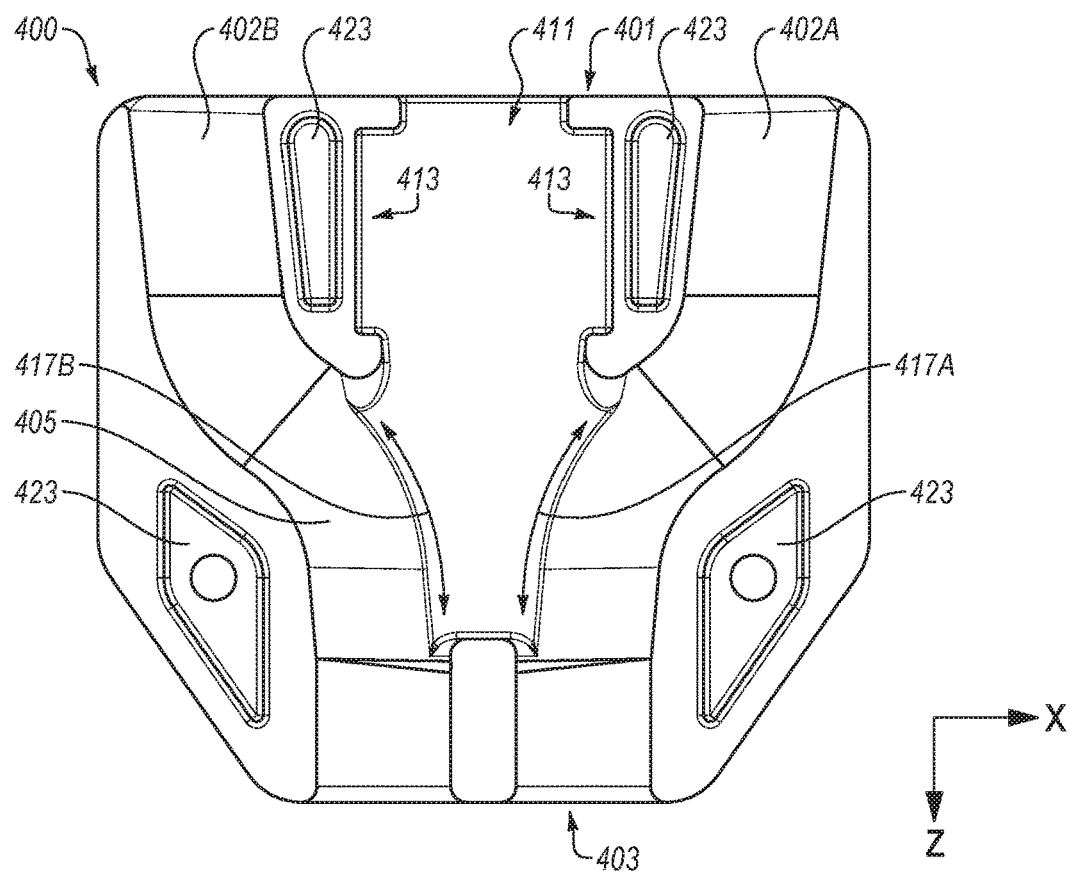
FIG. 4B illustrates another view of the upper housing of FIG. 4A.

FIGS. 4A and 4B illustrate an example embodiment of the upper housing 400 that may be implemented in the retention assembly 200 of FIGS. 2A and 2B. FIG. 4A is a perspective view of the upper housing 400. FIG. 4B is a planar view of the upper housing 400. FIGS. 4A and 4B depict an internal structure of the upper housing 400. With reference to FIGS. 4A and 2A, in an assembled configuration such as that of FIG. 2A, the internal structure of the upper housing 400 may not be visible. The upper housing 400 may be a component of a housing such as the housing 207. For instance, the upper housing 400 may be included with a lower housing such as the lower housing 500 described with reference to FIGS. 2A, 2B, 5A and 5B.

Referring to FIGS. 4A and 4B, the upper housing 400 includes upper portions or upper faces of features (e.g., 402A, 402B, 403, 405, etc.) described below. The portions included in the upper housing 400 may correspond to or otherwise interface with portions included in the lower housing 500. For example, the upper housing 400 may define upper portions of bungee channels 402A and 402B (generally bungee channel 402 or bungee channels 402, referred to above). The bungee channels 402 are configured to receive portions of a bungee such as the bungee 700. The bungee channels 402 are configured to selectively allow the bungee 700 to slide therethrough and to selectively secure the bungee 700 therein. For instance, the bungee channels 402 include a channel surface 405. The channel surface 405 includes an inner surface of the bungee channels 402 configured to contact a bungee (e.g., the bungee 700) positioned in the upper housing 400.

The bungee channels 402 may extend from the first end 401 (which may correspond to the first end 201 described above) and the second end 403. The bungee channels 402 of FIGS. 4A and 4B, bend towards one another. For instance, the bungee channels 402 may bend towards one another along curved portions of the bungee channels 402 between the first end 401 and the second end 403. In the depicted embodiment, the curved portions may be central to or approximately central to the upper housing 400. Accordingly, at the first end 401, the bungee channels 402 may be farther apart than at the second end 403. In other embodiments, the curved portions may be at another location or may be omitted. The bungee channels 402 may include one or more curves. For instance, after the first end 401, the bungee channels 402 may include an inward curve. After the inward curve, the bungee channels 402 may include a downward curve.

The upper housing 400 may include a hold cavity 411. The hold cavity 411 may be generally configured to receive a hold such as the hold 600 described elsewhere in the present disclosure. The hold aperture 205 may be defined at the first end 401 of the upper housing 400. Additionally, at a portion of the hold cavity 411 near the first end 401, the hold cavity 411 may include slide guides 413. The slide guides 413 may be configured to retain or restrict a motion of the hold relative to the upper housing 400. In particular, the slide guides 413 may include a corresponding structure to slide guides of the hold.

Figure 6A:
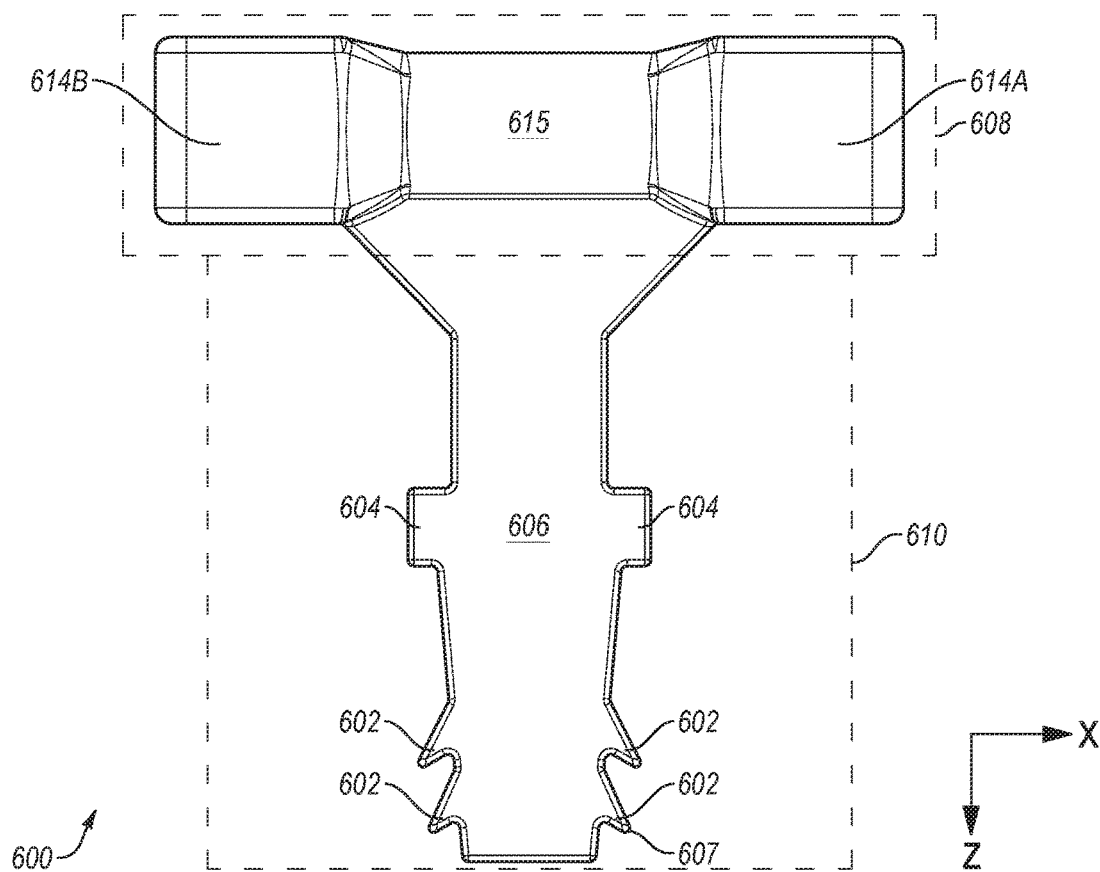
FIG. 6A illustrates an example hold that may be implemented in the retention assembly of FIG. 2A.
Figure 6B:
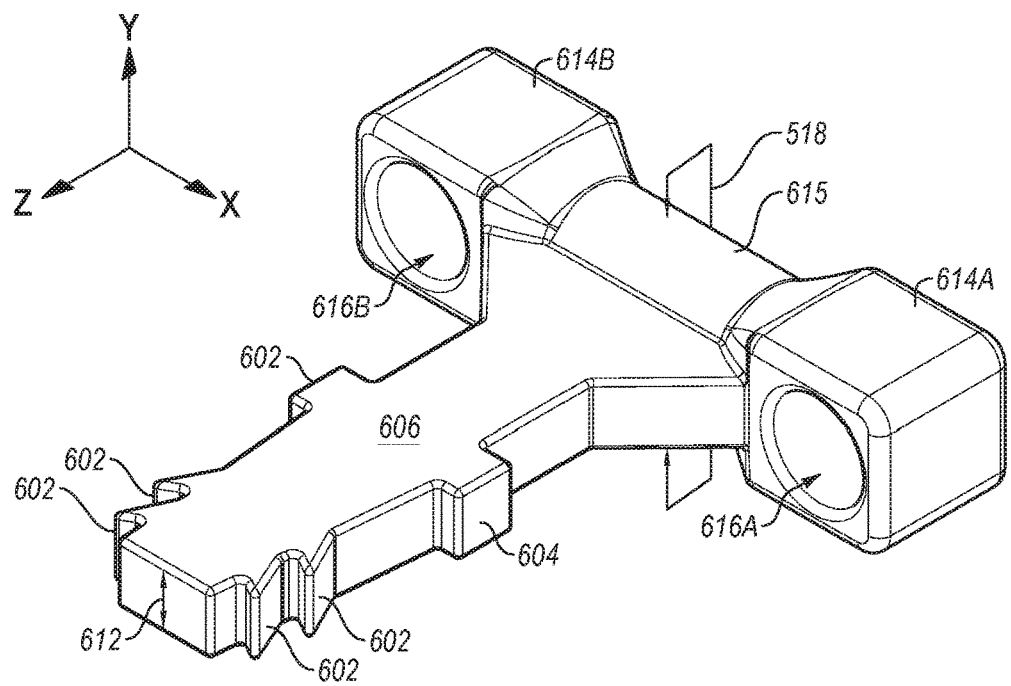
FIG. 6B illustrates another view of the hold of FIG. 6A.

For instance, with reference to FIGS. 4A and 6A, sliders 604 may be substantially rectangular. Accordingly, the slide guides 413 of the upper housing 400 may be an elongated rectangle in shape. Thus, the sliders 604 may be positioned in the slide guides 413 of the hold cavity 411 and move in a single direction (in FIG. 4B a Z-direction or negative Z-direction), which may be a substantially longitudinal translation relative to the upper housing 400.

The upper housing 400 may include one or more retainer openings 417A and 417B (generally, retainer opening 417 or retainer openings 417). The retainer openings 417 may be defined in a portion of the bungee channels 402. For instance, the retainer openings 417 may be defined in an interior part of the bungee channels 402 near the portion of the bungee channels 402 where the bungee channels 402 bend towards one another.

The retainer openings 417 may enable retainers such as the retainers 602 to selectively protrude into the bungee channels 402. For instance, with reference to FIGS. 4A and 6A, when the hold 600 is in a first position, which may be towards the first end 401, the retainers 602 may be positioned in the hold cavity 411 or may be retracted towards the first end 401. When the hold 600 is in a second position, the retainers 602 may extend from the hold cavity 411 into the bungee channels 402.

The upper housing 400 may also include one or more protrusions 423. The protrusions 423 may be configured to align and/or be attached to the lower housing such as the lower housing 500 of FIG. 5. The protrusions 423 may include two elongated protrusions near the first end 401 and two diamond-shaped protrusions near the second end 403. The protrusions 423 may be shaped and configured to be positioned in corresponding cavities in the lower housing 500. With reference to FIGS. 4A-5B, the protrusions 423 may correspond to cavities 523. For instance, two of the cavities 523 may be elongated to correspond to the elongated protrusions 423. Additionally, the cavities 523 may include diamond-shaped cavities that correspond to the diamond shaped protrusions. When the upper housing 400 is assembled with the lower housing 500, the protrusions 423 may be positioned in the cavities 523. The protrusions 423 may be press-fit into the cavities 523, which may retain or help retain the upper housing 400 relative to the lower housing 500.

Figure 5A:
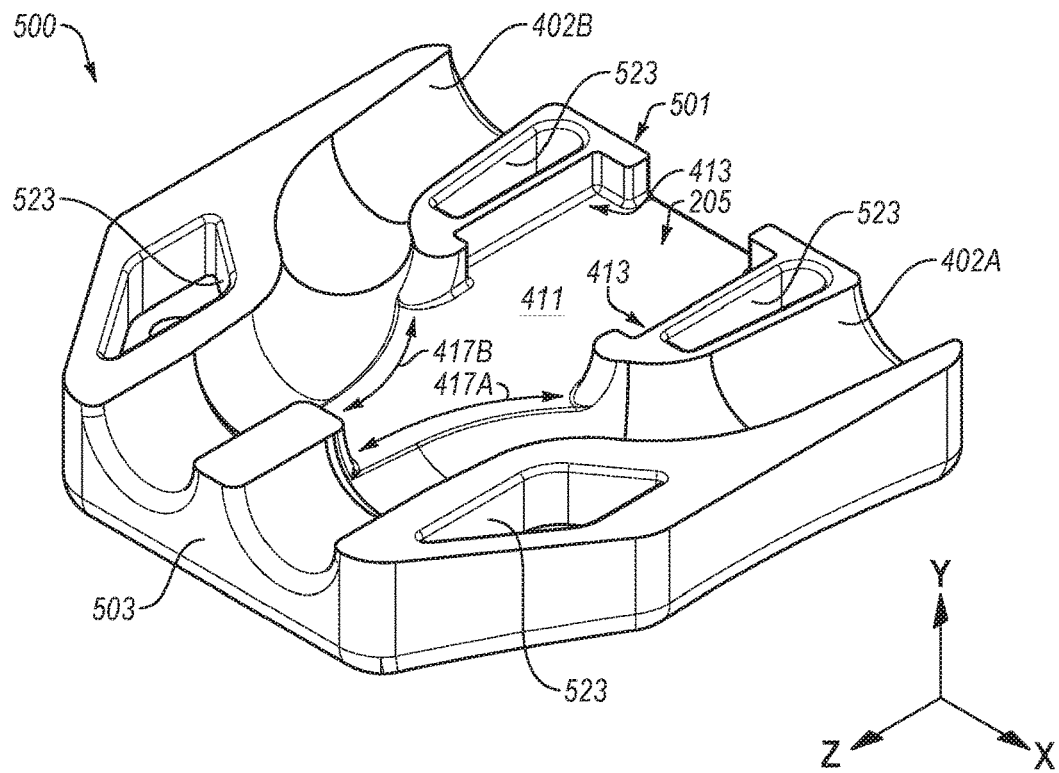
FIG. 5A illustrates an example lower housing that may be implemented in the retention assembly of FIG. 2A.
Figure 5B:
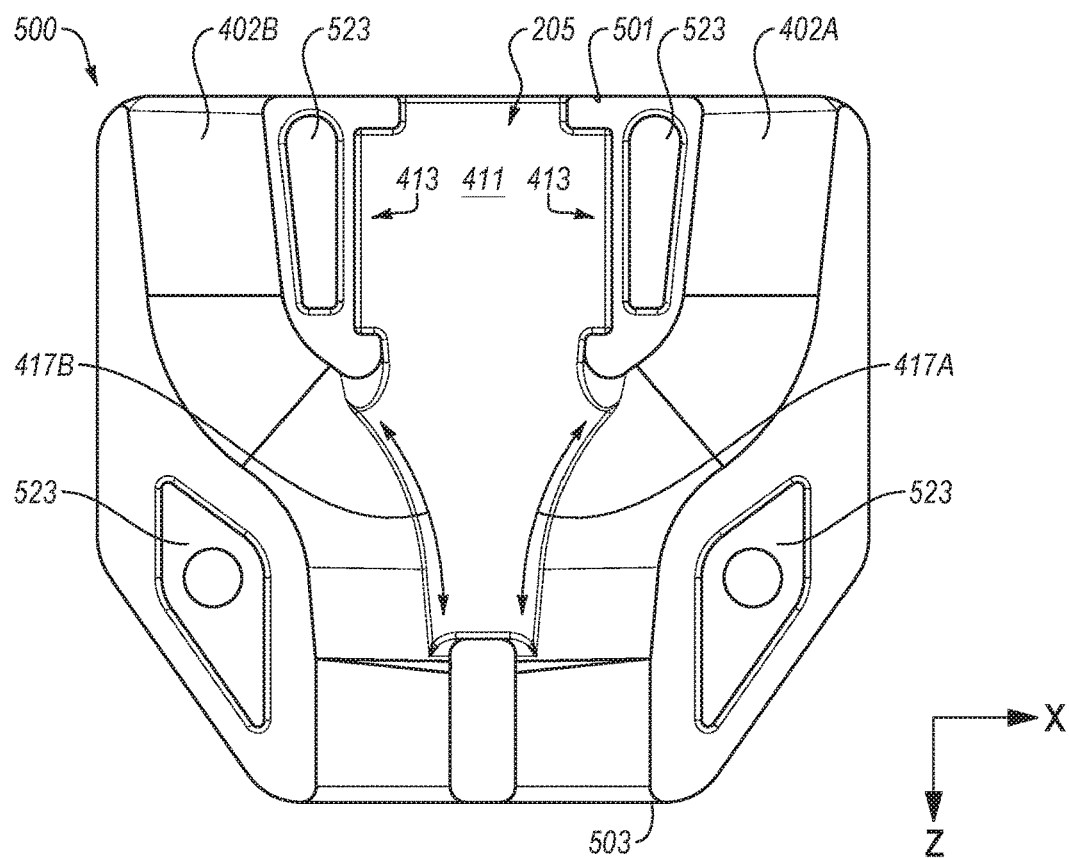
FIG. 5B illustrates another view of the lower housing of FIG. 5A.

FIGS. 5A and 5B illustrate an example embodiment of the lower housing 500 that may be implemented in the retention assembly 200 of FIGS. 2A and 2B. FIG. 5A is a perspective view of the lower housing 500. FIG. 5B is a planar view of the lower housing 500. FIGS. 5A and 5B depict an internal structure of the lower housing 500. With reference to FIGS. 5A and 2A, in an assembled configuration such as that of FIG. 2A, the internal structure of the lower housing 500 may not be visible. The lower housing 500 may be a component of the housing 207. For instance, the lower housing 500 may be included with an upper housing such as the upper housing 400 described with reference to FIGS. 4A and 4B.

Referring to FIGS. 5A and 5B, the lower housing 500 defines corresponding structures to those of the upper housing 400 described with reference to FIGS. 4A and 4B. For instance, the lower housing 500 may include features that correspond to or otherwise interface with features of the upper housing 400. For example, the lower housing 500 may define lower portions of bungee channels 402. The lower housing 500 includes a portion of the channel surface 405 configured to contact a bungee (e.g., the bungee 700).

Similar to the upper housing 400, the lower housing 500 may include a first end 501 and a second end 503. The bungee channels 402 may extend from the first end 501 and the second end 503. The bungee channels 502 of FIGS. 5A and 5B, bend towards one another in the lower housing 500 along curved portions 507 of the bungee channels 502 between the first end 501 and the second end 503.

The lower housing 500 may further include a lower portion of the hold cavity 411, the slide guides 413, the retainer openings 417, the hold aperture 205, or some combination thereof. These features are labelled on FIGS. 5A and 5B. In some embodiments, the hold cavity 411, the slide guides 413, the retainer openings 417, the bungee channels 402, or some combination thereof may be entirely defined in the lower housing 500 or the upper housing 400 of FIGS. 4A and 4B.

FIGS. 6A and 6B illustrate an example embodiment of the hold 600 that may be implemented in the retention assembly 200 of FIGS. 2A and 2B. FIG. 2A is a top view of the hold 600 and FIG. 6B is a perspective view of the hold 600. As described above, the hold 600 may be configured to be at least partially in a housing such as the housing 207 described in FIGS. 2A and 2B. The hold 600 is configured to translate relative to the housing. Translation in a first direction enables the hold 600 to grip and to lock a bungee relative to the housing. For instance, the hold 600 applies a first pressure to the bungee to press the bungee against a portion of a channel surface. Translation in a second direction releases the bungee, which may enable the bungee to move relative to the housing. For example, the translation in the second direction applies a second pressure to the bungee. The second pressure is less than the first pressure and may be substantially zero.

With reference to FIG. 6A, the hold 600 may include an outer or external portion 608 that is attached to an interior portion 610. In the embodiment of FIG. 6A, the interior portion 610 is substantially perpendicular to the exterior portion 608. The exterior portion 608 is positioned external to a housing such as the housing 207. The interior portion 610 is positioned at least partially within the housing. The amount of the interior portion 610 that is positioned in the housing may change due to translation of the hold 600 relative to the housing.

Referring to FIGS. 6A and 6B, the interior portion 610 may include two or more retainers 602 and two or more sliders 604. The retainers 602 and the sliders 604 extend in lateral directions from a central structure 606. The lateral directions include the x-direction and negative x-direction of FIG. 6A. In the embodiment of FIGS. 6A and 6B, the retainers 602 and the sliders 604 may include a thickness that substantially corresponds to a thickness 612 of the central structure 606. In other embodiments, the retainers 602 and/or the sliders 604 may include thicknesses that are different from the thickness 612.

The retainers 602 of FIGS. 6A and 6B may include angled structures. For instance, the retainers 602 extend away from the central structure 606 and away from the external portion 608. The retainers 602 may have an acute angle 607 (only one of which is labeled in FIGS. 6A and 6B). The acute angle 607 may be disposed at a portion of the retainers 602 farthest away from the external portion 608. The retainers 602 are configured to interfere with portions of the bungee retained in the bungee channel. For instance, the acute angle 607 may press against or into the bungee.

The sliders 604 are generally rectangular structures. The sliders 604 are configured to retain or restrict a motion of the hold 600. For instance, the sliders 604 may retain or restrict the motion of the hold 600 to a substantially longitudinal translation relative to the housing. In FIG. 6A, the longitudinal translation may substantially correspond to the y-direction of FIG. 6A. In FIGS. 6A and 6B, the hold 600 includes four retainers 602 and two sliders 604. In other embodiments, the hold 600 may include more or fewer than four retainers 602 and/or more or fewer than two sliders 604.

The external portion 608 may include two sleeves 614A and 614B (generally, sleeve 614 or sleeves 614) and a central section 615 between the sleeves 614. The sleeves 614 may be configured to extend from one end of a housing such as the housing 207 of FIGS. 2A-3B. The sleeves 614 define openings 616A and 616B (generally, opening 616 or openings 616, which are described with reference to FIGS. 3A and 3B). The openings 616 are configured to retain and surround exterior portions of the bungee. For instance, the openings 616 are configured to retain and surround exterior portions of the bungee that is adjacent to the first end (e.g., 501) of the housing.

In some embodiments, the sleeves 614 and the openings 616 therein are configured to grip an outer surface of the bungee. For instance, the openings 616 may be sized and configured to interfere with the outer surface of the bungee when the bungee is in un-stretched or retracted state (e.g., a force is not being applied to the bungee). Because the interference between the bungee and the sleeves 614, the bungee may pull on the hold 600 and translate the hold 600 relative to a housing. Additionally, application of a force (e.g., 306) to the bungee may deform the bungee and decrease a diameter of the bungee, which may enable the bungee to translate relative to the hold 600.

The central section 615 is connected to the central structure 606 and to the sleeves 614. In some embodiments, the hold 600 may be a single integrated structure. In other embodiments, the central section 615, the central structure 606, the sleeves 614, or some combination thereof may be affixed or mechanically coupled to one another.

The central section 615 may be sized and configured for retention in a hook system such as the hook system 104. For example, the central section 615 may include a diameter 618 (FIG. 6B) that corresponds to the hook system. With reference to FIGS. 1B and 6B, the central section 615 may be engaged with one of the cavities 124 or 122. Accordingly, the diameter 618 of the central section 615 may substantially correspond to a diameter of the cavities 124. The correspondence between the diameter 618 and the diameter of the cavities 124 may enable for a snap-fit connection when the central section 615 is engaged in the cavity 124. In some embodiments, the central section 615 may be engaged with the cavity 124 such that the sleeves 614 are positioned on either side of the hook system 104.

Figure 7:
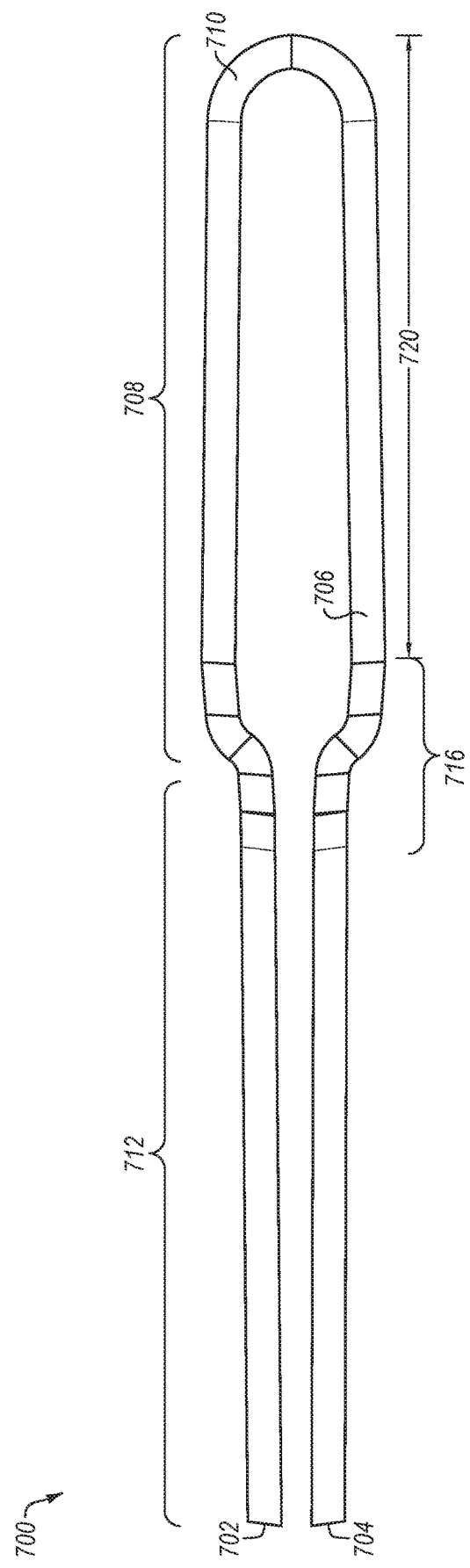
FIG. 7 illustrates an example bungee that may be implemented in the retention assembly of FIG. 2A.

FIG. 7 illustrates an example embodiment of the bungee 700 that may be implemented in the retention assembly 200 of FIGS. 2A and 2B. The bungee 700 is generally an elastic cord. In some embodiments, the bungee 700 may be elastic in a longitudinal direction. For instance, the bungee 700 may be stretched responsive to a force. Following removal of the force, the bungee 700 may reform to its dimensions prior to application of the force. Additionally, in some embodiments, the bungee 700 may be radially elastic. For instance, the bungee 700 may be squeezed to reduce a radial dimension. Following removal of the squeeze force, the bungee 700 may return to an initial radial dimension.

The bungee 700 may have a first end 702 and a second end 704 and a length 706 between the first end 702 and the second end 704. In some embodiments, the first end 702 and the second end 704 may be positioned in a bungee end retainer such as the bungee end retainer 211 described in FIGS. 2A and 2B.

When implemented in a retention assembly such as the retention assembly 200, the length 706 may be formed into a loop such that the first end 702 is positioned substantially next to the second end 704. The loop formed in the length may include an end portion 710 and the upper loop portion 708. The end portion 710 may be configured to be secured in a cavity of a hook system. For instance, with reference to FIGS. 1B and 7, the end portion 710 is secured in one of the cavities 122 in the hook system 104. Additionally, the arms 116 and 118 may be positioned at least partially in the upper loop portion 708 when the retention assembly 200 is engaged with the equipment mount 102. With reference to FIGS. 1A and 7, when the retention assembly 200 is disengaged from the equipment mount 102, the end portion 710 is not positioned or secured in one of the cavities 122 or 124 and at least one of the arms 116 and/or 118 may be removed from the upper loop portion 708. In some embodiments, the bungee 700 may be sized and configured to be received in and engaged in the hook system 104. For instance, a diameter of the bungee 700 may be sized such that the bungee 700 may be pressed into the cavities 122 or 124. Additionally or alternatively, in some embodiments the diameter of the bungee 700 may be similar or equivalent to the diameter of the central section 615 of FIGS. 6A and 6B. For instance, the central section 615 and the bungee 700 may be both configured to be engaged with and/or retained in the hook system 104 or a similar structure.

Referring back to FIG. 7, the bungee 700 may also include a lower loop portion 712. The upper loop portion 708 may be separated from the lower loop portion 712 by a transitional portion 716. The transitional portion 716 may include a first portion that is included in the lower loop portion 712 and an outward curve to the upper loop portion 708.

The transitional portion 716 of the bungee 700 may include parts or sections of the bungee 700 that are positioned in a tightening mechanism such as the tightening mechanism 300 described elsewhere in the present disclosure. For instance, the transitional portion 716 may be disposed in the bungee channels and contact channel surfaces of the housing. Additionally, in some embodiments, the retainers push against the transitional portion 716 of the bungee 700 against a portion of the channel surface at the curved portion.

Tightening a retention assembly including the bungee 700 may include pulling or otherwise applying a force to the lower loop portion 712. The transitional portion 716 may move towards the end portion 710. This movement of the transitional portion 716 may reduce a length 720 of the upper loop portion 708 defined between the transitional portion 716 to the end portion 710. Conversely, loosening the retention assembly may include releasing the retainers, which may enable an increase in the length 720 of the upper loop portion 708.

FIGS. 8A-10B illustrate another example equipment rack 800, which is referred to in the present disclosure as a watersport rack 800, as well as a second bungee loop retention assembly 1000 (hereinafter, second retention assembly 1000). The watersport rack 800 and the second retention assembly 1000 may be substantially similar to the equipment rack 100 and retention assembly 200, respectively described above. Thus, the watersport rack 800 may include similar components and functions to the equipment rack 100 and the second retention assembly 1000 may include similar components and functions to retention assembly 200. Some details regarding the components and functions of the watersport rack 800 and the second retention assembly 1000 are provided below with reference to FIGS. 8A-10B. It may be appreciated with the benefit of this disclosure that at least some of the structures and functions described with reference to the equipment rack 100 may be similarly applied to the watersport rack 800 and at least some of the structures and functions described with reference to the retention assembly 200 may be similarly applied to the second retention assembly 1000.

Figure 8A:
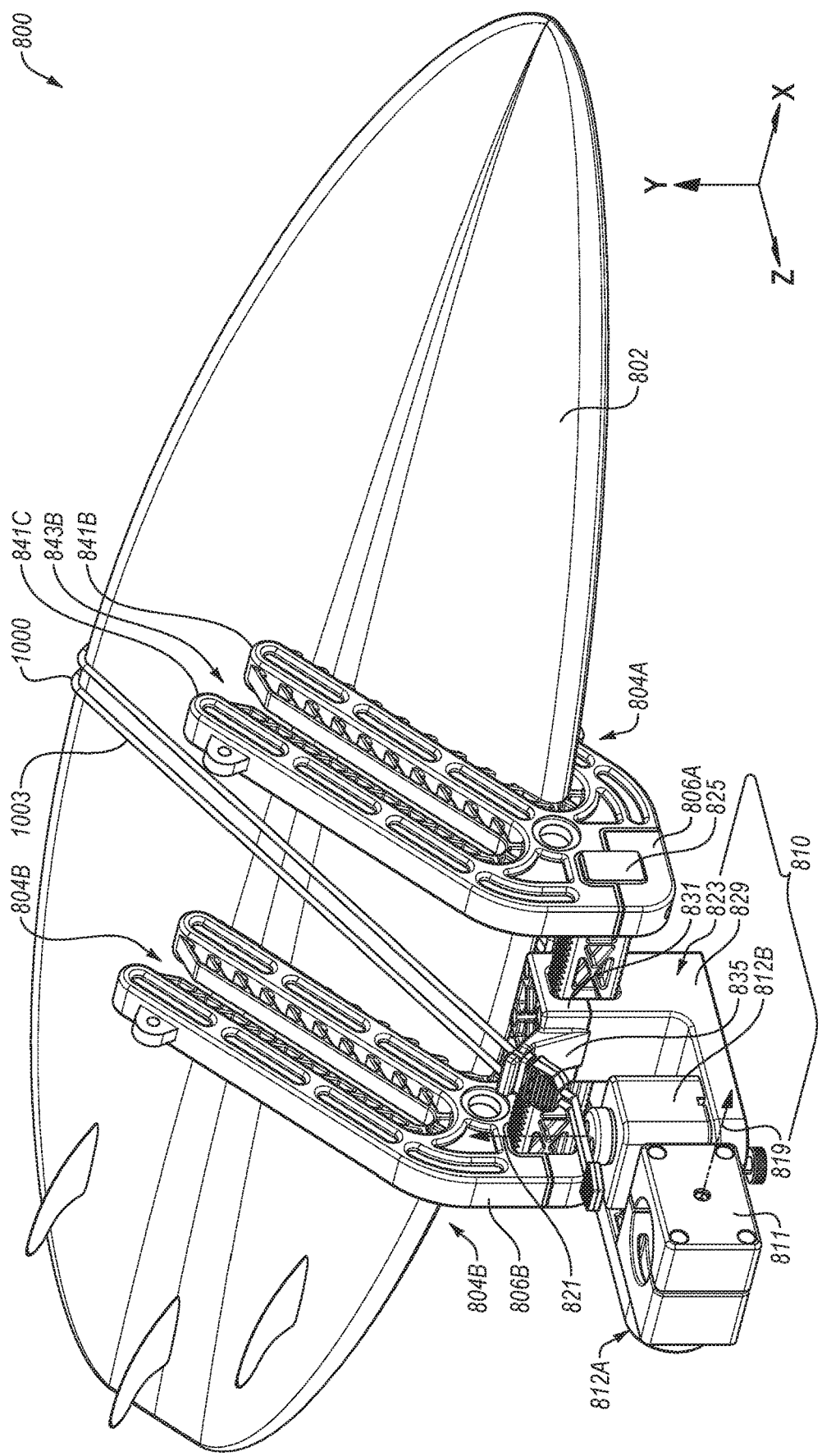
FIG. 8A illustrates another exemplary equipment rack.
Figure 8B:
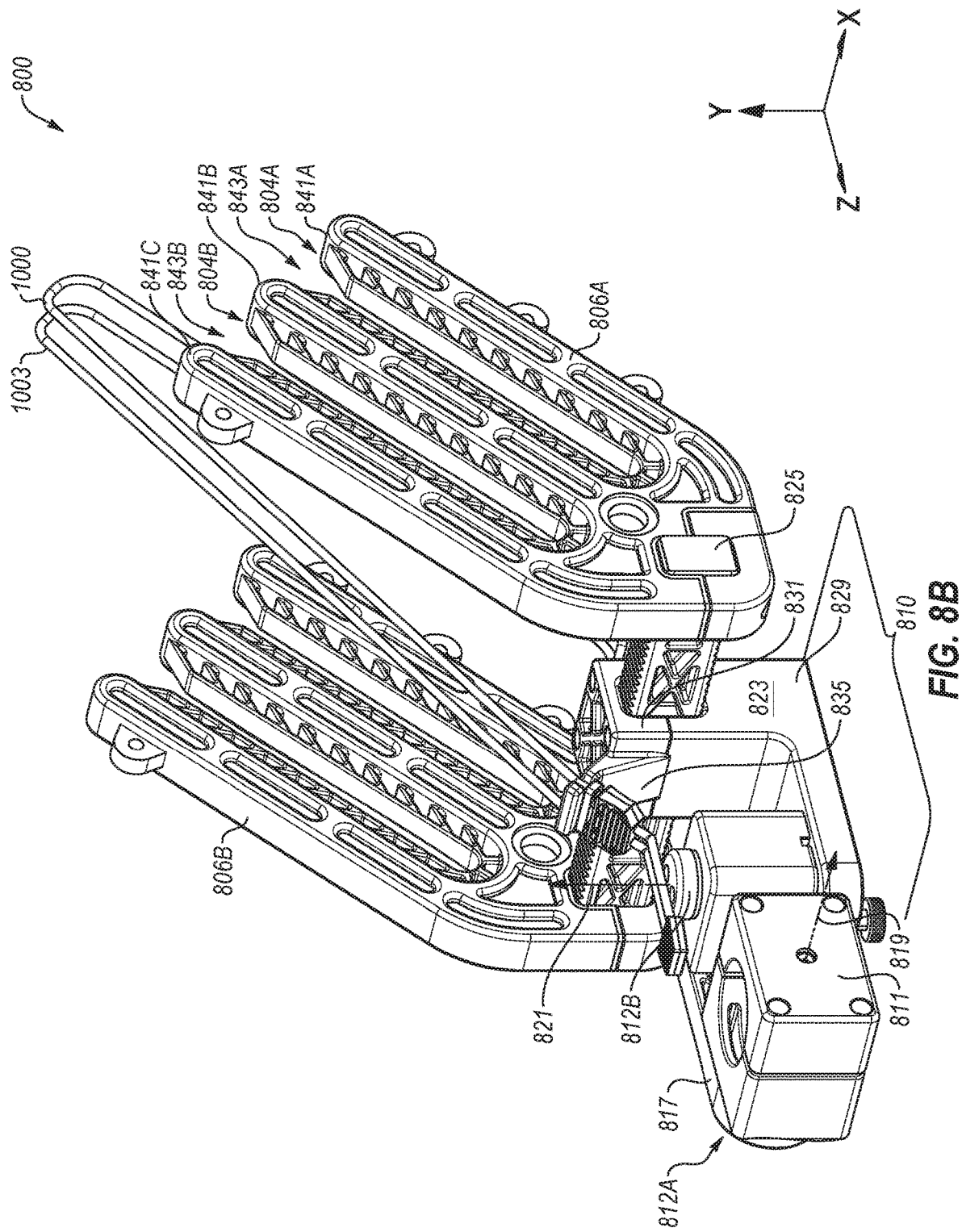
FIG. 8B illustrates another view of the equipment rack of FIG. 8A.
Figure 8C:
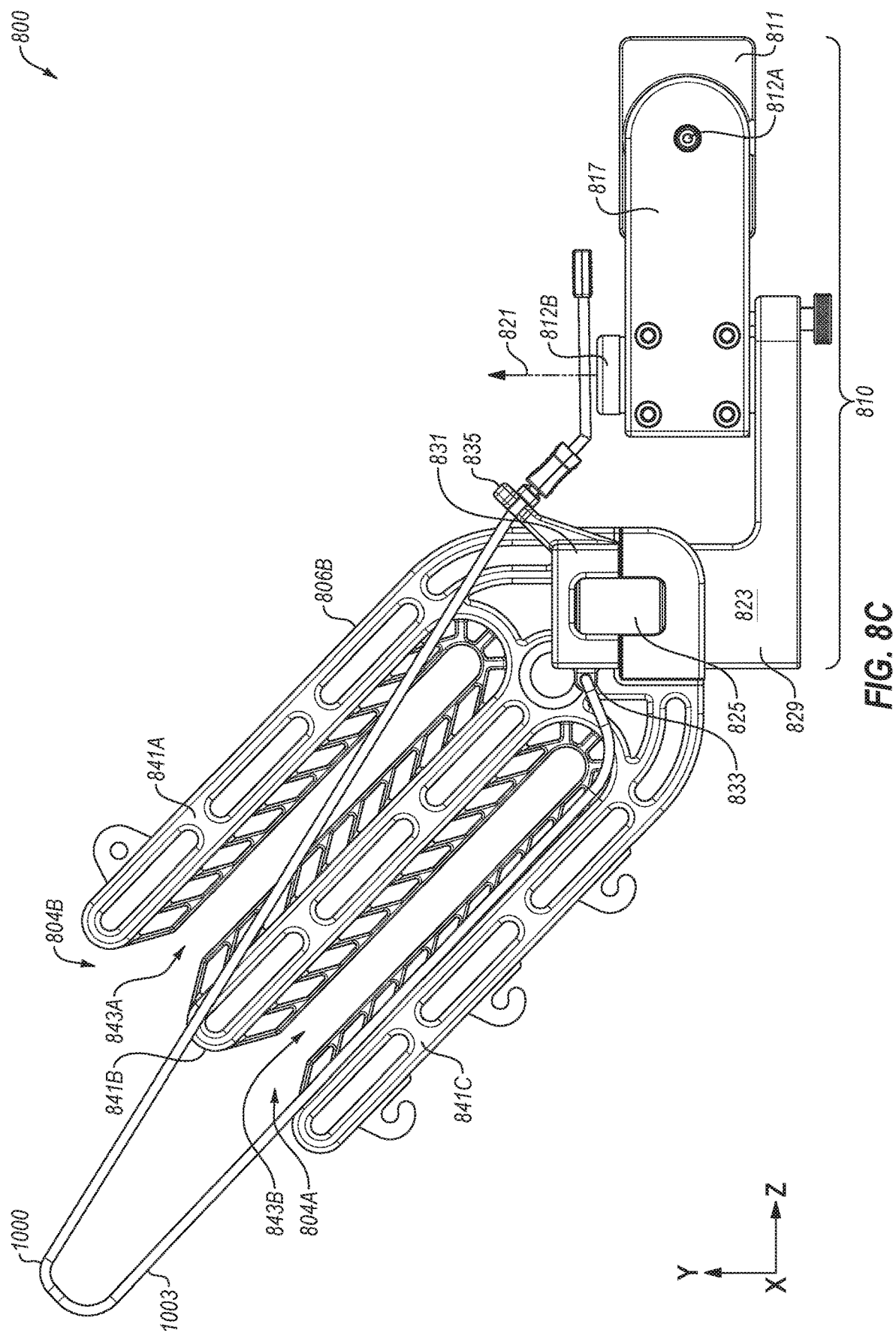
FIG. 8C illustrates another view of the equipment rack of FIG. 8A.

Turning to FIGS. 8A-8C, the watersport rack 800 may be configured to retain equipment related to watersports such as surfboards, wakesurf boards, skis, and the like. Similar to the equipment rack 100 described above, the watersport rack 800 may be implemented to retain an article or an item relative to a vehicle. In general, the watersport rack 800 is configured for use with a water vehicle such as a ski boat. The watersport rack 800 may also be implemented with another suitable vehicle such as an ATV. For example, in FIG. 8A a wakesurf board 802 is depicted as retained in the watersport rack 800 by the second retention assembly 1000. In other embodiments, the watersport rack 800 may be configured to retain another article or item as described above.

FIG. 8A depicts the watersport rack 800 with the wakesurf board 802 retained in a first jaw set 804A of the watersport rack 800. A second jaw set 804B of the watersport rack 800 is empty. The wakesurf board 802 is retained to the watersport rack 800 by the second retention assembly 1000. FIG. 8B depicts the watersport rack 800 without the wakesurf board 802 in the first jaw set 804A. FIG. 8C is a side view of the watersport rack 800 with one of two jaw assemblies 806A or 806B (generally, jaw assembly 806 or jaw assemblies 806) removed.

For instance, the watersport rack 800 of FIGS. 8A-8C may include a connection assembly, which is generally referred to at 810. The connection assembly 810 may include a cylinder clamp 811 that is connected to the jaw assemblies 806 via two rotational supports 812A and 812B. The cylinder clamp 811 is configured to selectively attach to a cylindrical element of a frame. For example, the cylindrical clamp 811 may be selectively attached to a wakeboard tower when implemented on a ski boat. In other embodiments, the cylindrical clamp 811 may be selectively attached to another suitable frame element. The cylindrical clamp 811 secures the watersport rack 800 relative to the frame element.

The rotational supports 812A and 812B may enable rotational positioning of the jaw assemblies 806A and 806B relative to the cylindrical clamp 811. For example, a first rotational support 812A may be rotationally attached to the cylindrical clamp 811. The first rotational support 812A may enable rotation of the jaw assemblies 806 about a first axis 819, which is substantially parallel to the x-axis of FIG. 8A. Similarly, a second rotational support 812B may enable rotation of the jaw assemblies 806 about a second axis 821, which is substantially parallel to the y-axis of FIG. 8A. The second rotational support 812B may be attached to an arm 817, which is further connected to the first rotational support 812A. The jaw assemblies 806 may be attached to the second rotational support 812B by an L-bracket 823 and a pinion 825. The pinion 825 may be set in the L-bracket 823 to position the jaw assemblies 806 relative to the L-bracket 823. For instance, the pinion 825 may enable the jaw assemblies 806 to be set in generally the x-direction of FIG. 10A.

The L-bracket 823 may include a lower element 829 and an upper element 831. The pinion 825 may be positioned and secured between the lower element 829 and the upper element 831. For instance, the upper element 831 may be selectively secured relative to the lower element 829. To set the position of the pinion 825 relative to the L-bracket 823, the upper element 831 may be removed or partially removed from the lower element 829. The pinion 825 may be translated in the x-direction or negative x-direction relative to the L-bracket 823. The upper element 831 may be re-secured to the lower element 829 to retain the pinion 825 in a particular position.

The upper element 831 may include a bungee hook 835 and a bungee retainer 833. The bungee hook 835 and the bungee retainer 833 may be configured to engage with the second retention assembly 1000. A bungee 1003 may be engaged in the bungee retainer 833 at a center portion 1005 of the bungee 1003. For example, as depicted in FIG. 8A, the bungee 1003 may extend up and over the wakesurf board 802. A tightening mechanism 1007 and the bungee 1003 may be selectively engaged with the bungee hook 835, which may retain the wakesurf board 802 relative to the first jaw set 804A. Some additional details of the upper element 831 and the second retention assembly 1000 are provided with reference to FIGS. 9A and 9B.

In the embodiment of FIGS. 8A-8C, the jaw assemblies 806 may each include three longitudinal arms 841A-841C (generally, longitudinal arm 841 or longitudinal arms 841). The longitudinal arms 841 may extend from the pinion 825 in a direction generally away from the L-bracket 823. The longitudinal arms 841 are connected at a first end that is attached to the pinion 825. The longitudinal arms 841 are generally parallel to one another as the longitudinal arms 841 extend away from the first end.

The three longitudinal arms 841 define two jaws 843A and 843B (generally, jaw 843 or jaws 843) in which an article may be disposed. For instance, two of the longitudinal arms 841 define each of the jaws 843. The first jaw set 804A and the second jaw set 804B may include one of the jaws 843 in each of the jaw assemblies 806A and 806B.

The second retention assembly 1000 is disposed between the jaw assemblies 806. Accordingly, articles placed in the first jaw set 804A or the second jaw set 804B may extend from the first jaw assembly 806A to the second jaw assembly 806B such that a portion of the article is disposed between the jaw assemblies 806. The second retention assembly 1000 may accordingly contact the portion of the article between the jaw assemblies 806 to retain the article relative to the watersport rack 800. Disengagement of the second retention assembly 1000 from the upper element 831 may release the article from the jaw set 804. For instance, the tightening mechanism 1007 may be released, which may loosen the bungee 1003. The bungee 1003 may then be pulled from the bungee hook 835. The article may then be slid from the jaw set 804.

In other embodiments, one or both of the jaw assemblies 806 may include two or more longitudinal arms 841. For instance, one or both of the jaw assemblies 806 may include two, three, four, or more longitudinal arms 841. These and other jaw assemblies 806 may accordingly include one, two, three, or more jaws 843. Additionally or alternatively, the watersport rack 800 may include two or more jaw assemblies 806. For instance, the watersport rack 800 may include two, three, or four of the jaw assemblies 806. Increasing a number of jaw assemblies 806 may enable larger articles to be retained in the watersport rack 800.

Additionally, in some embodiments, the watersport rack 800 may include another suitable connection assembly 810. For instance, the watersport rack 800 may omit one or both of the rotational supports 812 and/or integrate the rotational supports 812 into a single structure. Additionally or alternatively, the watersport rack 800 may include another suitable mechanism suitable to position the jaw assemblies 806 relative to the L-bracket 823. For example, the watersport rack 800 may include a gear-based translational mechanism, a quick-release based translational mechanism, etc. In these and other embodiments, the watersport rack 800 may omit the pinion 825.

Figure 9A:
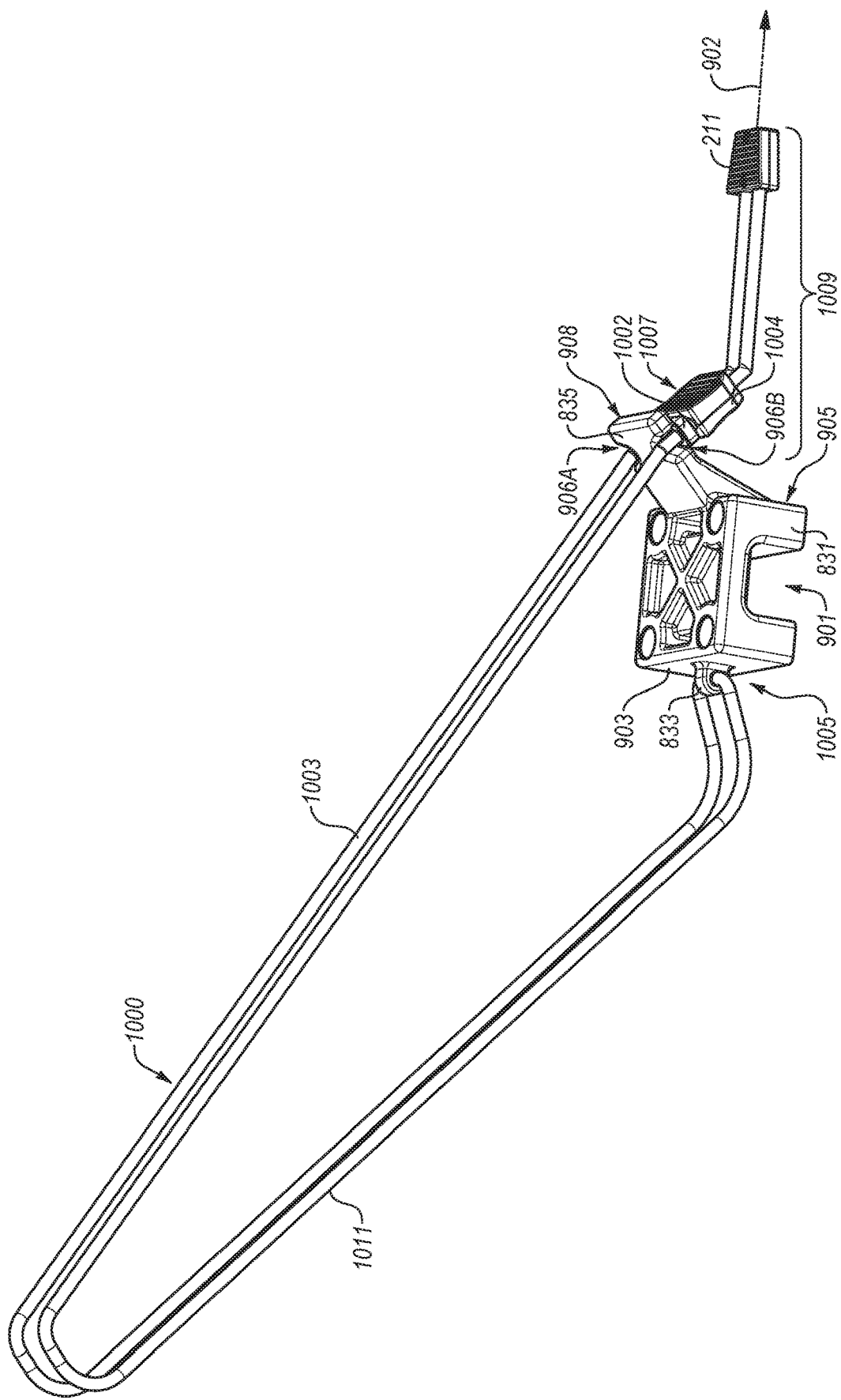
FIG. 9A illustrates an enlarged view of an exemplary upper element and an exemplary second bungee loop retention assembly that may be implemented in the equipment rack of FIG. 8A.

FIGS. 9A and 9B depict enlarged perspective views of the upper element 831 of the L-bracket 823 (of FIGS. 8A-8C) and the second retention assembly 1000. FIGS. 9A and 9B depict the second retention assembly 1000 engaged with the upper element 831.

The upper element 831 of FIGS. 9A and 9B is generally a rectangular block that defines a channel 901. The channel 901 may be configured to at least partially receive a pinion such as the pinion 825 described above. The bungee retainer 833 may be positioned at least partially on a first surface 903. The bungee retainer 833 may include a hoop or a pad eye in which the center portion 1005 of the bungee 1003 is disposed.

The bungee hook 835 may be positioned at least partially on a second surface 905. The second surface 905 may be opposite the first surface 903. The bungee hook 835 may extend at an angle from the second surface 905 of the upper element 831. For instance, in the depicted embodiment, the bungee retainer 833 may extend up and away from a rectangular portion of the upper element 831. As best illustrated in FIG. 9A, the bungee hook 835 may include two cutouts 906A and 906B (generally, cutout 906 or cutouts 906). The cutouts 906 are positioned near (e.g., within about an inch) from an end 908 of the bungee hook 835. The cutouts 906 may be configured to receive a portion of the bungee 1003. For instance, a diameter of the cutouts 906 may be substantially similar or the same as a diameter of the bungee 1003.

The second retention assembly 1000 may include the bungee 1003, the tightening mechanism 1007, and the bungee end retainer 211. The tightening mechanism 1007 may further include a second hold 1002 and a second housing 1004. The bungee 1003 may be substantially similar to and may correspond to the bungee 700 described above. For example, the bungee 1003 is generally an elastic cord. In some embodiments, the bungee 1003 may be elastic in a longitudinal direction. For instance, the bungee 1003 may be stretched responsive to a force. Following removal of the force, the bungee 1003 may reform to its dimensions prior to application of the force. Additionally, in some embodiments, the bungee 1003 may be radially elastic. For instance, the bungee 1003 may be squeezed to reduce a radial dimension. Following removal of the squeeze force, the bungee 1003 may return to an initial radial dimension.

The bungee 1003 may include the center portion 1005, a loop portion 1011, and an end portions 1009. The center portion 1005 may be approximately (e.g., within about 10%) center of the bungee 1003. The center portion 1005 is retained in the bungee retainer 833. When a force is applied to the bungee 1003, the center portion 1005 retained in the bungee retainer 833 such that the bungee 1003 is stretched. The loop portion 1011 includes a portion of the bungee 1003 from the center portion 1005 to the bungee hook 835. The loop portion 1011 extends around an article placed in a jaw set. For instance, with reference to FIGS. 8A and 9A the loop portion 1011 may extend around the wakesurf board 802. Terminal portions of the loop portion 1011 may be positioned in the cutouts 906.

The end portion 1009 may include ends of the bungee 1003, which are disposed in the bungee end retainer 211, along with parts of the bungee 1003 adjacent to the ends. For instance, the end portion 1009 may include parts of the bungee 1003 from the ends to the bungee hook 835. The end portion 1009 also includes portions that are disposed in the tightening mechanism 1007. As described elsewhere in the present disclosure, the portions may be disposed in bungee channels and contact channel surfaces of the second housing 1004. Some additional details of the bungee channels are described elsewhere in the present disclosure.

The tightening mechanism 1007 is substantially similar to the tightening mechanism 300 described above. For example, the tightening mechanism 1007 may be configured in the restricted configuration and the unrestricted configuration described above. For instance, the second hold 1002 may be translated relative to the second housing 1004 to transition between the restricted configuration and the unrestricted configuration. In the unrestricted configuration, a portion of the bungee 1003 may be positioned in the second housing 1004 and may slide through the tightening mechanism 1007. As the bungee 1003 slides through the tightening mechanism 1007, sizes of the end portion 1009 and the loop portion 1011 may change. For instance, as the second hold 1002 and the second housing 1004 move relative to the bungee 1003, the loop portion 1011 may decrease or increase in size. Changes to the size of the loop portion 1011 may enable the tightening mechanism 1007 to be used for a specific purpose. For instance, the loop portion 1011 may be enlarged or shortened to extend from the bungee retainer 833 over an article (e.g, the wakesurf board 802) to the bungee hook 835.

In the restricted configuration, sizes of the end portion 1009 and the loop portion 1011 may be set. For example, the loop portion 1011 may be secured to the bungee retainer 833, wrapped around the article, and retained at the bungee hook 835. The tightening mechanism 1007 may then be transitioned to the restricted configuration. The size of the loop portion 1011 may then be set, which may maintain the loop portion 1011 at a particular length. Thus, in the restricted configuration, the article may be retained relative to jaw assemblies such as the jaw assemblies 806 described above.

Figure 10A:
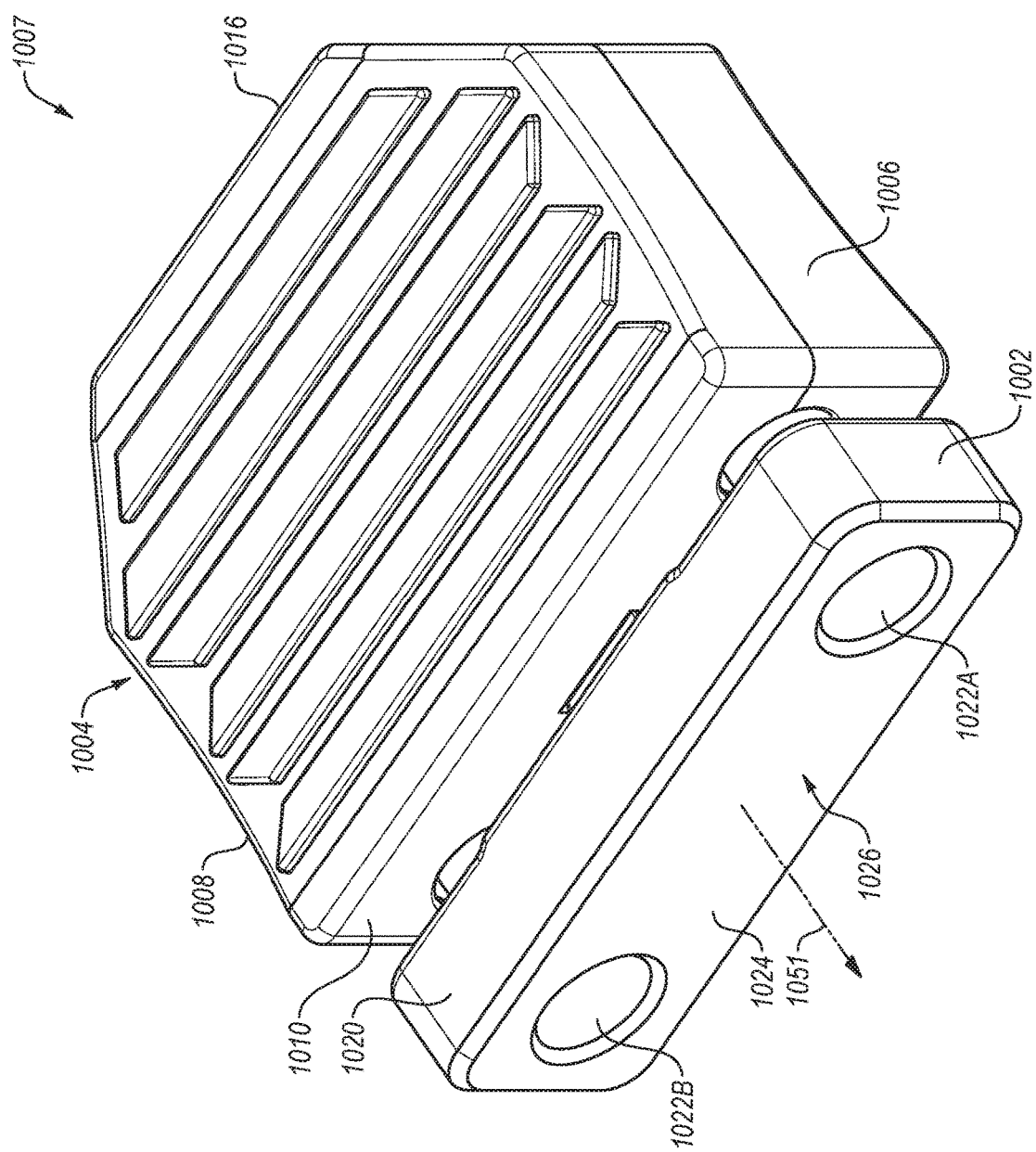
FIG. 10A illustrates an exemplary tightening mechanism that may be implemented in the second bungee loop retention assembly of FIG. 9A.
Figure 10B:
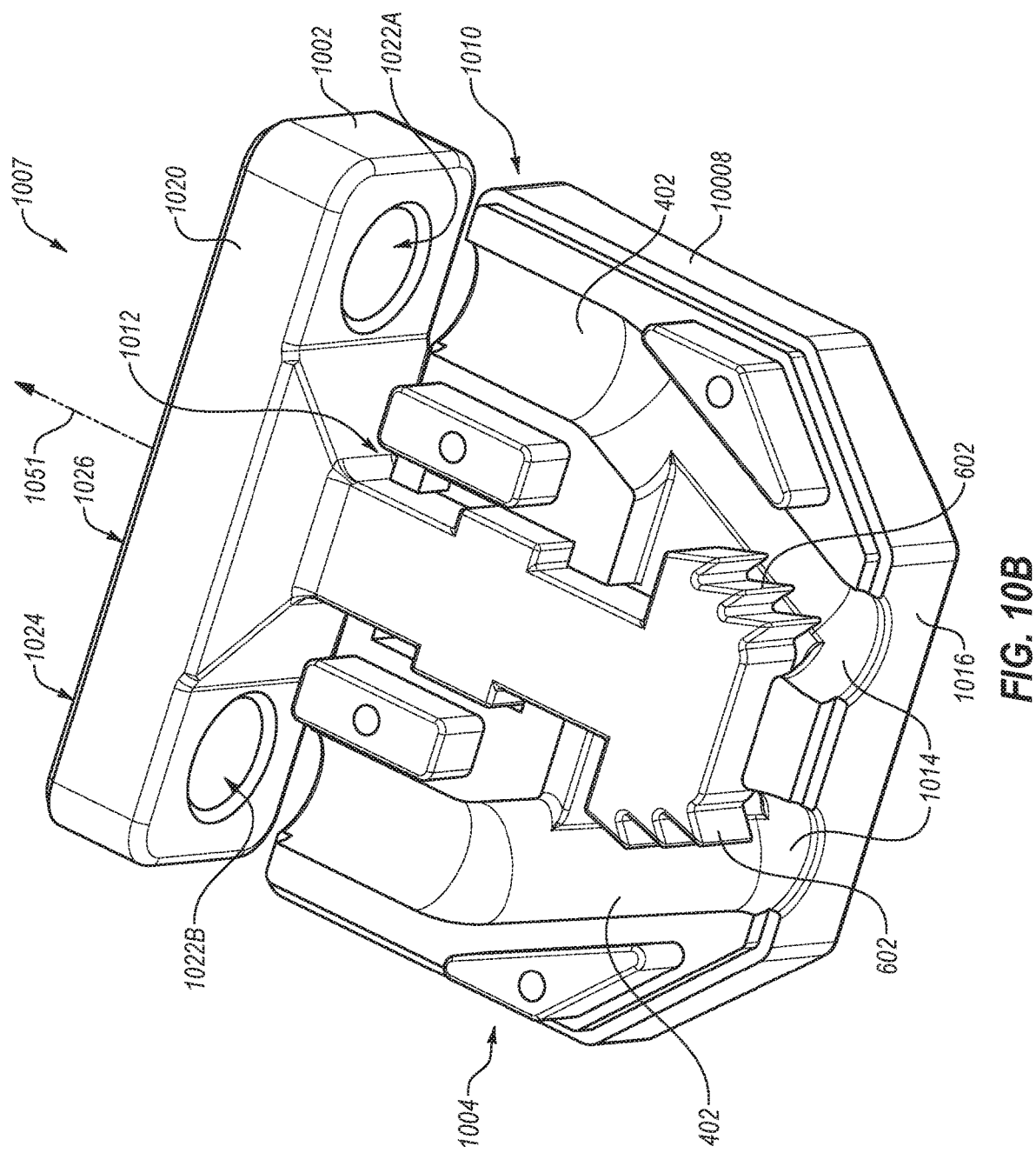
FIG. 10B illustrates another view of the tightening mechanism of FIG. 10A, all in accordance with at least one embodiment described in the present disclosure.

Some additional details of the tightening mechanism 1007 are described with reference to FIGS. 10A and 10B. For instance, FIGS. 10A and 10B illustrate an example embodiment of the second hold 1002 implemented in the second housing 1004. FIG. 10A is a first perspective view of the second hold 1002 and the second housing 1004. FIG. 10B is a second perspective view of the second hold 1002 and the second housing 1004. In FIG. 10B an upper housing 1006 is removed such that an internal view of a lower housing 1008 of the second housing 1005 is visible and the structure of the second hold 1002 is visible.

With combined reference to FIGS. 9A-10B, the second housing 1004 may be configured to receive a portion of the bungee 1003. The portion of the bungee 1003 positioned in the second housing 1004 is referred to as the housed portion. The housed portion may be disposed in the bungee channels 402 defined in the upper and lower housings 1006 and 1008. The bungee channels 402 are described above. The second hold 1002 is also partially disposed in the second housing 1004. The second hold 1002 is configured to translate relative to the second housing 1004, which may transition the tightening mechanism 1007 from the restricted configuration to an unrestricted configuration.

In particular, the second hold 1002 may be translated such that retainers 602 may interfere with parts of the housed portion of the bungee 1003, which places the tightening mechanism 1007 in a restricted configuration. As described above, in the restricted configuration, the second hold 1002 may be a first distance from the first end 1010 of the second housing 1004.

Translation of the second hold 1002 in a direction represented by arrow 1051 (FIG. 10B) may place the tightening mechanism 1007 in the unrestricted configuration. In the unrestricted configuration, the retainers 602 may be removed from the housed portion of the bungee 1003 or a force imposed on the housed portion may be reduced. The removal or reduction of force may enable the bungee 1003 to move through the tightening mechanism 1007.

The bungee channels 402 of FIGS. 10A and 10B may be similar to those described with reference to FIGS. 3A and 3B. However, the bungee channels 402 include a less-curved structure. Accordingly, the housed portions may similarly take a corresponding, less-curved shape when disposed in the second housing 1004. The housed portion of the bungee 1003 may accordingly include a substantially parallel portion near the first end 1010. The housed portion of the bungee 1003 then bends towards one another and proceeds through exits 1014 defined on a second end 1016 of the second housing 1004. The housed portion may be substantially parallel as they exit the second housing 1004.

The second hold 1002 operates substantially similarly to the hold 600 described elsewhere in the present disclosure. For example, the second hold 1002 translates relative to the second housing 1004 to reconfigure in the tightening mechanism 1007 between the restricted configuration and the unrestricted configuration. In particular, the second hold 1002 may be moved relative to the second housing 1004 to engage or disengage the retainers 602 from the housed portion.

In addition, the second hold 1002 includes an external portion 1020. The external portion 1020 includes two sleeves 1022A and 1022B (generally, sleeve 1022 or sleeves 1022). The sleeves 1022 may be similar to the sleeves 614. For instance, the sleeves 1022 may be sized and configured relative to the bungee 1003. In some embodiments, when a force is applied to the bungee 1003, a diameter of the bungee 1003 may decrease. Diameters of the sleeves 1022 may be sized such that when the force is applied, the bungee 1003 may translate through the sleeves 1022. Additionally, the diameter of the sleeves 1022 may be sized such that the bungee 1003 interferes with the sleeves 1022 when the force is removed and the diameter of the bungee 1003 increases. Accordingly, in these and other embodiments, the sleeve 1022 may have an interference fit in the sleeves 1022.

The external portion 1020 includes a rectangular portion 1024 between the sleeves 1022. The rectangular portion 1024 may include a substantially flat surface 1026. The substantially flat surface 1026 may be configured to contact the bungee hook 835. The flat surface 1026 may be configured to contact a portion of the bungee hook 835 between the cutouts 906. Portions of the bungee 1003 may be disposed in the cutouts 906 and the flat surface 1026 may contact the portion of the bungee hook 835 between the cutouts 906.

With the flat surface 1026 in contact with the bungee hook 835, a position of the second hold 1002 may be maintained. For instance, the bungee hook 835 may retain the second hold 1002 relative to the second housing 1004 as well as relative to the upper element 831.

Additionally, when the tightening mechanism 1007 is configured in the restricted configuration, the second housing 1004 is positioned relative to the second hold 1002. The bungee hook 835 may act to maintain the second housing 1004 in the position to prevent or help prevent the tightening mechanism 1007 from transitioning to the unrestricted configuration. Thus, the bungee hook 835 may perform a similar function to a cavity of a hook system such as the cavity 122 of the hook system 104 of FIG. 1B.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Although this invention has been described in terms of certain preferred embodiments, other embodiments apparent to those of ordinary skill in the art are also within the scope of this invention. Accordingly, the scope of the invention is intended to be defined only by the claims which follow. All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A bungee loop retention assembly, the retention assembly comprising:
  a housing including a first end and a second end;
  bungee channels disposed in the housing and extending from the first end to the second end;
  a hold aperture disposed in the housing; and
  a hold positioned at least partially in the housing, the hold including:
    an external portion having two sleeves and a central section between the sleeves, the sleeves each defining openings that are sized and configured to retain and surround exterior portions of a bungee; and
    one or more retainers that are configured to interfere with a portion of a bungee retained in the bungee channel,
  wherein:
    the hold is configured to translate relative to the housing from a first position in which the retainers are adapted to squeeze the bungee against a channel surface to a second position in which the retainers are adapted to be substantially separated from the bungee, and
    in the first position, the bungee is adapted to be bound to inner surfaces of the openings and to the housing via the retainers such that an intra-mechanism force caused by retraction of the bungee is adapted to pull the hold against the housing and adapted to press the retainers against the bungee;
  wherein the housing includes an upper housing and a lower housing;
  wherein the upper housing defines an upper surface face of the bungee channels;
  wherein the lower housing defines a lower surface face of the bungee channels; and
  wherein the upper housing and lower housing define retainer openings in which the retainers of the hold are positioned.

2. The retention assembly of claim 1, wherein the central section is sized and configured for retention in a hook system.

3. The retention assembly of claim 1, wherein the sleeves are sized such that application of a force on an end of the bungee reduces a diameter of the bungee enabling translation of the bungee through the hold.

4. A bungee loop retention assembly, the retention assembly comprising:
  a housing including a first end and a second end;
  bungee channels disposed in the housing and extending from the first end to the second end;
  a hold aperture disposed in the housing; and
  a hold positioned at least partially in the housing, the hold including:
    an external portion having two sleeves and a central section between the sleeves, the sleeves each defining openings that are sized and configured to retain and surround exterior portions of a bungee; and
    one or more retainers that are configured to interfere with a portion of a bungee retained in the bungee channel,
  wherein:
    the hold is configured to translate relative to the housing from a first position in which the retainers are adapted to squeeze the bungee against a channel surface to a second position in which the retainers are adapted to be substantially separated from the bungee, and
    in the first position, the bungee is adapted to be bound to inner surfaces of the openings and to the housing via the retainers such that an intra-mechanism force caused by retraction of the bungee is adapted to pull the hold against the housing and adapted to press the retainers against the bungee;
  wherein the bungee channels include a first bungee channel and a second bungee channel;
  wherein the first bungee channel is separated from the second bungee channel by a first distance at the first end and by a second distance at the second end, the first distance being greater than the second distance;
  wherein the first and the second bungee channels bend towards one another along curved portions of the bungee channels between the first end and the second end;
  wherein the retainers push the bungee against a portion of the channel surface at the curved portions.

5. The retention assembly of claim 4, wherein:
  a first portion of the first bungee channel at the first end is substantially parallel to a second portion of the first bungee channel at the second end; and
  a first curved portion of the first bungee channel includes an inward curve and a second curve towards the second end.

6. The retention assembly of claim 4, wherein an interior portion of the hold is positioned between the first bungee channel and the second bungee channel within the housing.

7. The retention assembly of claim 6, wherein the housing includes slide guides configured to retain a motion of the hold in a substantially longitudinal translation relative to the housing by disposing a portion of the hold in the slide guides.

8. A bungee loop retention assembly comprising:
  a bungee;
  a housing including a first end and a second end, the housing defining two bungee channels that extend from the first end to the second end and a hold aperture, the bungee channels having a channel surface that are configured to contact portions of the bungee in the housing; and
  a hold positioned at least partially in the housing, the hold including two or more retainers, a first sleeve, a second sleeve, and a central section between the sleeves,
  wherein:
    the hold is configured to translate relative to the housing such that in a first position, the retainers apply a first pressure to the bungee against a portion of the channel surface, and in a second position the retainers apply a second, lower pressure to the bungee against the portion of the channel surface,
    the first sleeve including an opening that is sized and configured to receive a first portion of the bungee, the second sleeve including an opening that is sized and configured to receive a second portion of the bungee, and in the first position, an intra-mechanism force caused by a retraction of the bungee pulls the hold towards the housing and presses the retainers against the bungee;

wherein an interior portion of the hold is positioned between the first bungee channel and the second bungee channel within the housing; and wherein the housing includes slide guides configured to retain a motion of the hold in a substantially longitudinal translation relative to the housing.

9. The retention assembly of claim 8, wherein the bungee includes a first end and a second end and a length between the first end and the second end, the first end being positioned next to the second end such that a portion of the length is in the housing.

10. The retention assembly of claim 9, further comprising a bungee end retainer that connects the first end and the second end of the bungee.

11. The retention assembly of claim 8, wherein:

the sleeves are configured to retain and surround exterior portions of the bungee adjacent to the first end of the housing; and the central section is sized and configured for retention in a hook system.

12. A bungee loop retention assembly comprising:

a bungee;

a housing including a first end and a second end, the housing defining two bungee channels that extend from the first end to the second end and a hold aperture, the bungee channels having a channel surface that are configured to contact portions of the bungee in the housing; and a hold positioned at least partially in the housing, the hold including two or more retainers, a first sleeve, a second sleeve, and a central section between the sleeves, wherein:

the hold is configured to translate relative to the housing such that in a first position, the retainers apply a first pressure to the bungee against a portion of the channel surface, and in a second position the retainers apply a second, lower pressure to the bungee against the portion of the channel surface, the first sleeve including an opening that is sized and configured to receive a first portion of the bungee, the second sleeve including an opening that is sized and configured to receive a second portion of the bungee, and in the first position, an intra-mechanism force caused by a retraction of the bungee pulls the hold towards the housing and presses the retainers against the bungee;

wherein the two bungee channels comprise a first bungee channel and a second bungee channel, the first bungee channel and the second bungee channel bend towards one another along a curved portion of the first bungee channel and a curved portion of the second bungee channel; and wherein the retainers push the bungee against a portion of the channel surface at the curved portion of the first bungee channel and the second bungee channel.

13. The retention assembly of claim 12, wherein:

a first portion of a first bungee channel at the first end of the housing is substantially parallel to a second portion of the first bungee channel at the second end of the housing; and the curved portion of the first bungee channel includes an inward curve and the curved portion of the second bungee channel includes an inward curve.

14. A bungee loop retention assembly comprising:

a bungee;

a housing including a first end and a second end, the housing defining two bungee channels that extend from the first end to the second end and a hold aperture, the bungee channels having a channel surface that are configured to contact portions of the bungee in the housing; and a hold positioned at least partially in the housing, the hold including two or more retainers, a first sleeve, a second sleeve, and a central section between the sleeves, wherein:

the hold is configured to translate relative to the housing such that in a first position, the retainers apply a first pressure to the bungee against a portion of the channel surface, and in a second position the retainers apply a second, lower pressure to the bungee against the portion of the channel surface, the first sleeve including an opening that is sized and configured to receive a first portion of the bungee, the second sleeve including an opening that is sized and configured to receive a second portion of the bungee, and in the first position, an intra-mechanism force caused by a retraction of the bungee pulls the hold towards the housing and presses the retainers against the bungee wherein the bungee channels define retainer openings along a portion of an interior part of the channel surface.

15. The retention assembly of claim 14, wherein the retainers of the hold are disposed in and translate in the retainer openings.

16. An equipment rack comprising:

an equipment mount having a hook system disposed along a portion of an outer edge, the hook system including a first plurality of cavities disposed along a first side and a second plurality of cavities on a second side;

a bungee loop retention assembly that is configured to extend from one of the first plurality of cavities across the equipment mount, the bungee loop retention assembly including:

a bungee having a first end and a second end and a length therebetween the first end and the second end, the first end being positioned next to the second end such that a first portion between the first and second ends is configured to be secured in the first plurality of cavities;

a housing defining two bungee channels and a hold aperture, the bungee channels having a channel surface that are configured to contact portions of the bungee in the housing; and a hold positioned at least partially in the housing, the hold including two or more retainers that are configured to interfere with portions of the bungee retained in the bungee channel, an external portion having two sleeves and a central section between the two sleeves;

wherein:
the two sleeves are configured to retain and surround exterior portions of the bungee adjacent to a first end of the housing and to grip the bungee such that the hold translates relative to the housing in response to withdrawal of a force on an end of the bungee;
the central section is sized and configured for retention in one cavity of the second plurality of cavities;
the hold is configured to translate relative to the housing such that in a first position, the retainers apply a first pressure to the bungee against a portion of the channel surface, and in a second position the retainers apply a second, lower pressure to the bungee against the portion of the channel surface;
in the first position, the bungee is bound to inner surfaces of the openings and to the housing via the retainers such that an intra-mechanism force caused by retraction of the bungee pulls the hold against the housing and presses the retainers against the bungee;
the bungee channels define retainer openings along a portion of an interior part of the channel surface; and
the retainers of the hold are disposed in and translate in the retainer openings.

17. An equipment rack comprising:
an equipment mount having a hook system disposed along a portion of an outer edge, the hook system including a first plurality of cavities disposed along a first side and a second plurality of cavities on a second side;
a bungee loop retention assembly that is configured to extend from one of the first plurality of cavities across the equipment mount, the bungee loop retention assembly including:
a bungee having a first end and a second end and a length therebetween the first end and the second end, the first end being positioned next to the second end such that a first portion between the first and second ends is configured to be secured in the first plurality of cavities;
a housing defining two bungee channels and a hold aperture, the bungee channels having a channel surface that are configured to contact portions of the bungee in the housing; and
a hold positioned at least partially in the housing, the hold including two or more retainers that are configured to interfere with portions of the bungee retained in the bungee channel, an external portion having two sleeves and a central section between the two sleeves;
wherein:
the two sleeves are configured to retain and surround exterior portions of the bungee adjacent to a first end of the housing and to grip the bungee such that the hold translates relative to the housing in response to withdrawal of a force on an end of the bungee;
the central section is sized and configured for retention in one cavity of the second plurality of cavities;
the hold is configured to translate relative to the housing such that in a first position, the retainers apply a first pressure to the bungee against a portion of the channel surface, and in a second position the retainers apply a second, lower pressure to the bungee against the portion of the channel surface;
in the first position, the bungee is bound to inner surfaces of the openings and to the housing via the retainers such that an intra-mechanism force caused by retraction of the bungee pulls the hold against the housing and presses the retainers against the bungee;
the first and the second bungee channels bend towards one another along curved portions of the bungee channels between the first end and the second end; and
the retainers push the bungee against a portion of the channel surface at the curved portion.

\* \* \* \* \*